US008694865B2

(12) United States Patent
Baek et al.

(10) Patent No.: US 8,694,865 B2
(45) Date of Patent: Apr. 8, 2014

(54) DATA STORAGE DEVICE CONFIGURED TO REDUCE BUFFER TRAFFIC AND RELATED METHOD OF OPERATION

(75) Inventors: Sung Hoon Baek, Daejeon (KR); Won Moon Cheon, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 98 days.

(21) Appl. No.: 13/301,025

(22) Filed: Nov. 21, 2011

(65) Prior Publication Data

US 2012/0166910 A1 Jun. 28, 2012

(30) Foreign Application Priority Data

Dec. 22, 2010 (KR) ........................ 10-2010-0132643

(51) Int. Cl.
*G11C 29/00* (2006.01)
(52) U.S. Cl.
USPC ............................................ 714/770
(58) Field of Classification Search
USPC ................ 714/763, 800, 746, 769–770
See application file for complete search history.

(56) References Cited

U.S. PATENT DOCUMENTS

| 2007/0028145 | A1 | 2/2007 | Gerhard et al. | |
|---|---|---|---|---|
| 2007/0168706 | A1 | 7/2007 | Humlicek | |
| 2009/0198885 | A1 | 8/2009 | Manoj | |
| 2009/0265578 | A1* | 10/2009 | Baloun et al. | 714/6 |
| 2011/0238885 | A1* | 9/2011 | Kitahara et al. | 711/103 |
| 2011/0239088 | A1* | 9/2011 | Post | 714/763 |
| 2011/0271039 | A1 | 11/2011 | Baek et al. | |
| 2012/0278531 | A1* | 11/2012 | Horn | 711/103 |

OTHER PUBLICATIONS

Gerry Houlder et al., "XOR Commands on SCSI Disk Drives".

* cited by examiner

*Primary Examiner* — Shelly A Chase
(74) *Attorney, Agent, or Firm* — Volentine & Whitt, PLLC

(57) ABSTRACT

A method is provided for performing a write operation in a data storage device comprising a storage medium, a processing unit, and a buffer memory storing data to be transferred to the storage medium under control of the processing unit. The method comprises aggregating data in the buffer memory as a strip group comprising multiple data strips, transferring data strips in at least one strip group to the storage medium, calculating a parity strip based on the transferred data strips of the at least one strip group without additional access to the buffer memory, and transferring the parity strip to the storage medium.

20 Claims, 43 Drawing Sheets

DATA STORAGE DEVICE CONFIGURED TO REDUCE BUFFER TRAFFIC AND RELATED METHOD OF OPERATION

CROSS-REFERENCE TO RELATED APPLICATIONS

This application claims priority under 35 U.S.C. §119 to Korean Patent Application No. 10-2010-0132643 filed on Dec. 22, 2010, the disclosure of which is hereby incorporated by reference in its entirety.

BACKGROUND OF THE INVENTION

Embodiments of the inventive concept relate generally to electronic data storage technologies. More particularly, embodiments of the inventive concept relate to data storage devices and related methods of operation.

Most computer systems include a main memory for storing data used by current applications, and a long-term memory for mass data storage. The main memory typically comprises a volatile memory, such as a dynamic random access memory (DRAM) or a static random access memory (SRAM), and the long-term memory typically comprises a hard disk drive (HDD) or a solid-state drive (SSD).

HDDs have several well-known limitations, such as relatively slow access times and a tendency to experience mechanical failures. Accordingly, there is a general trend to replace HDDs in many systems with SSDs. An SSD typically comprises a plurality of nonvolatile memory chips, such as flash memory chips or resistive memory chips. SSDs provide many advantages over HDDs, including relatively low power consumption and the ability to withstand physical shock.

The continuing adoption of SSDs has been accompanied by increasing performance demands. Consequently, researchers are continually seeking ways to improve the speed and data storage capacity of SSDs.

SUMMARY OF THE INVENTION

According to one embodiment of the inventive concept, a method is provided for performing a write operation in a data storage device comprising a storage medium, a processing unit, and a buffer memory storing data to be transferred to the storage medium under control of the processing unit. The method comprises aggregating data in the buffer memory as a strip group comprising multiple data strips, transferring data strips in at least one strip group to the storage medium, calculating a parity strip based on the transferred data strips of the at least one strip group without additional access to the buffer memory, and transferring the parity strip to the storage medium.

According to another embodiment of the inventive concept, a data storage device is provided. The data storage device comprises storage media, a buffer memory, a processing unit, a control logic configured to control an access operation of the storage media under control of the processing unit, and a parity generator configured to generate a parity strip based on data strips of at least one strip group transferred to the storage media from the buffer memory under control of the processing unit and without additional access to the buffer memory.

According to another embodiment of the inventive concept, a method is provided for performing a write operation in a memory device comprising a flash memory, a processing unit, a flash translation layer, and a buffer memory storing data to be transferred to the flash memory under control of the processing unit. The method comprises storing data in the buffer memory, aggregating the data stored in the buffer memory as a strip group comprising multiple data strips by performing address mapping in the flash translation layer, transferring the data strips in the strip group to the flash memory, performing an XOR operation on the data strips transferred to the flash memory to generate a parity strip, and transferring the parity strip to the flash memory.

These and other embodiments of the inventive concept can reduce data traffic of a buffer memory by generating a parity strip from data strips that have been transferred from the buffer memory to storage media.

BRIEF DESCRIPTION OF THE DRAWINGS

The drawings illustrate selected embodiments of the inventive concept. In the drawings, like reference numbers indicate like features.

DETAILED DESCRIPTION

Figure 1:
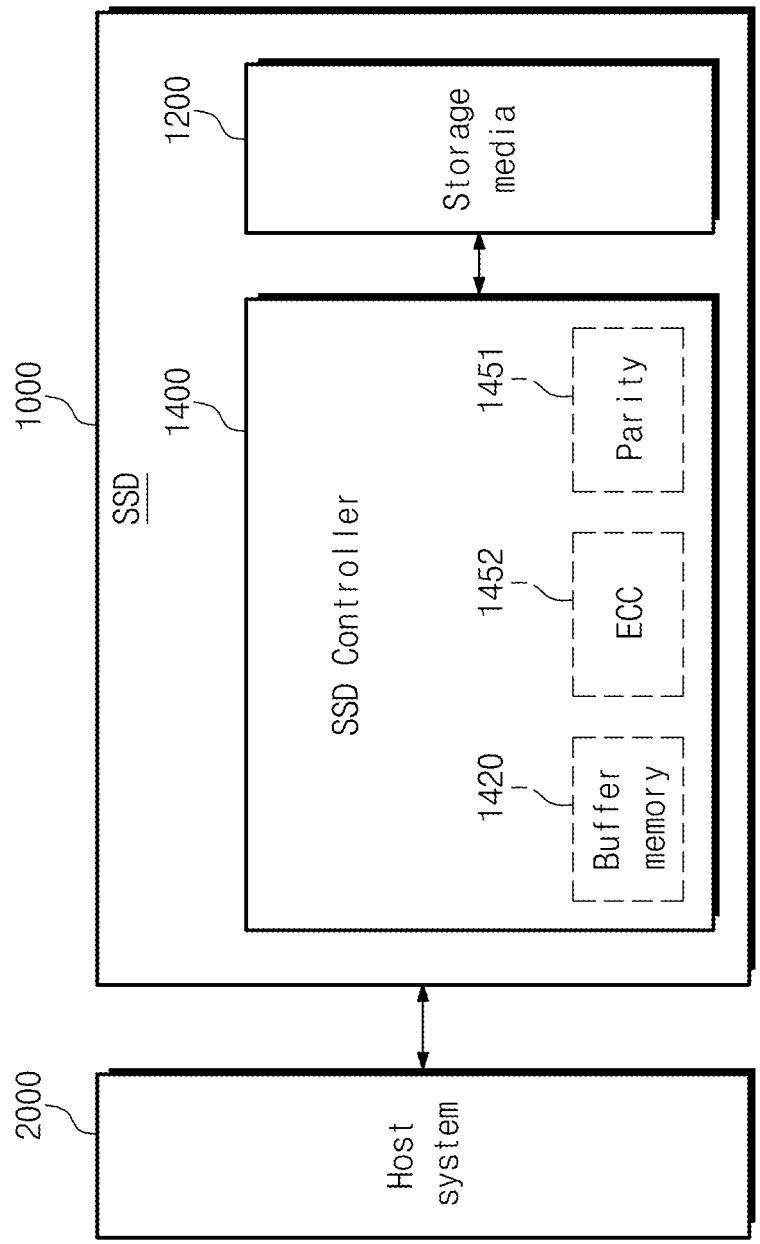
FIG. 1 is a block diagram of a system comprising a data storage device according to an embodiment of the inventive concept.

Embodiments of the inventive concept are described below with reference to the accompanying drawings. These embodiments are presented as teaching examples and should not be construed to limit the scope of the inventive concept.

In the description that follows, the terms first, second, third etc. are used to describe various features, but these features should not be limited by these terms. Rather, these terms are used merely to distinguish between different features. Thus, a first feature could be termed a second element, component, region, layer or section without departing from the teachings of the inventive concept.

Spatially relative terms such as "beneath", "below", "lower", "under", "above", and "upper" may be used herein to describe spatial relationships between different features in the drawings. The spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the terms "below" and "under" can encompass both an orientation of above and below. The device may be otherwise oriented (rotated 90 degrees or at other orientations) and the spatially relative descriptors used herein interpreted accordingly. In addition, where a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" indicates any and all combinations of one or more of the associated listed items.

Where an element or layer is referred to as being "on", "connected to", "coupled to", or "adjacent to" another feature, it can be directly on, connected, coupled, or adjacent to the other feature, or intervening features may be present. In contrast, where a feature is referred to as being "directly on," "directly connected to", "directly coupled to", or "immediately adjacent to" another feature, there are no intervening features present.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and/or the present specification and will not be interpreted in an idealized or overly formal sense unless expressly so defined herein.

FIG. 1 is a block diagram of a system comprising a data storage device according to an embodiment of the inventive concept.

Referring to FIG. 1, the system comprises a data storage device 1000 and a host system 2000. Data storage device 1000 operates in response to requests from host system 2000 and is used to store data information for host system 2000. Data storage device 1000 can be, for example, a solid-state drive (SSD) that uses non-volatile memory devices as its storage media. Alternatively, data storage device 1000 can take other forms such as a hard disk drive (HDD).

Data storage device 1000 comprises one or more storage media 1200 and an SSD controller 1400. Storage media 1200 store data sent from host system 2000 or to be sent thereto under the control of SSD controller 1400. Data transferred from host system 2000 is stored temporarily in a buffer memory 1420. In particular, SSD controller 1400 may manage an address mapping of data temporarily stored in buffer memory 1420 to configure strip groups. In other words, where random or sequential write-requested data of host system 2000 is stored in buffer memory 1420, SSD controller 1400 can manage an address mapping associated with data stored in buffer memory 1420 to be configured to one or more strip groups without respect to a write request type.

A strip group is formed of a plurality of strips (or, a plurality of data strips). A strip can be variously defined according to a memory type applied to storage media 1200. For example, where storage media 1200 is formed of flash memory devices, a strip may be formed by one or more pages. In certain embodiments described below, a strip is formed of one page, and in other embodiments, a strip can alternatively be formed of one or more blocks of pages or one or more sectors each less in size than one page.

SSD controller 1400 further comprises a parity generating block 1451 and an ECC generating block 1452. Where one or more strips are prepared, SSD controller 1400 sends data of buffer memory 1420 to storage media 1200 by the strip group. After data strips in a strip group are sent to storage media 1200, parity generating block 1451 of SSD controller 1400 performs an XOR operation on data strips, as will be more fully described below.

A result of the XOR operation (called "a parity strip") is added to the strip group for error correction. Data strips and the added parity strip within the strip group constitute one stripe or a full-stripe-write unit. The added parity strip can be stored in storage media 1200 with the data strips of the strip group. This write operation can be called a full-stripe-write operation. Where data strips in a strip group are sent to the storage media, ECC generating block 1452 of SSD controller 1400 is configured to generate ECC information on respective data and parity strips. That is, ECC information is added to respective data and parity strips constituting a stripe.

Because a parity strip is generated when data strips of a strip group are sent to storage media 1200, generation of a parity strip in one stripe can be made without additional/further access to buffer memory 1420 or without a traffic increase of buffer memory 1420. In other words, a write operation of the data storage device according to an embodiment of the inventive concept may cause less of a traffic increase in buffer memory 1420 compared with a conventional write operation that does not include generation of a parity strip.

Figure 2:
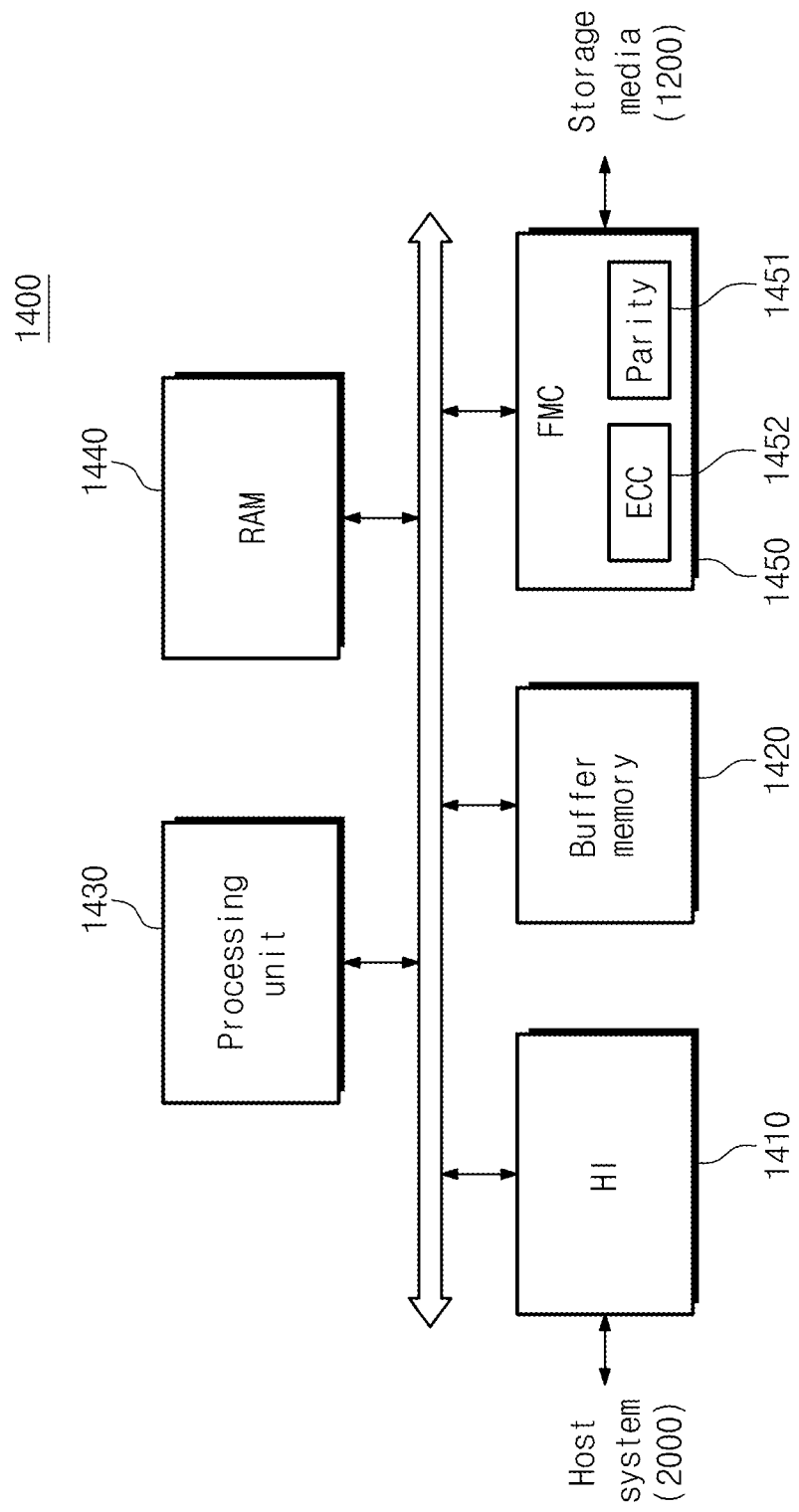
FIG. 2 is a block diagram of an SSD controller illustrated in FIG. 1 according to an embodiment of the inventive concept.

FIG. 2 is a block diagram of SSD controller 1400 of FIG. 1 according to an embodiment of the inventive concept.

Referring to FIG. 2, SSD controller 1400 comprises a host interface (HI) 1410, buffer memory 1420, a processing unit 1430 such as a microprocessor or CPU, a RAM 1440, and a flash memory controller (FMC) 1450.

Host interface 1410 provides an interface with a host system 2000. A connection between data storage device 1000 and host system 2000 can be formed by a wired or wireless host interface 1410. Buffer memory 1420 is used to store data transferred from host system 2000 or data to be transferred to host system 2000. Processing unit 1430 is configured to control overall operations of SSD controller 1400. Where data storage device 1000 is powered, for example, codes (e.g., a flash translation layer (FTL)) stored in storage media 1200 are loaded on RAM 1440. On the other hand, instead of a code RAM, a code ROM can be used to store the above-described codes. The FTL can be used to manage an address mapping, wear-leveling of storage media 1200, and data preservation during unexpected power loss.

Flash memory controller 1450 controls access to storage media 1200 in response to a request of processing unit 1430. Flash memory controller 1450 comprises parity generating block 1451 and ECC generating block 1452. As above described, where one or more strip groups are prepared via an address mapping, data of buffer memory 1420 may be transferred to storage media 1200 by the strip group. Where data strips in a strip group are transferred to storage media 1200, respectively, parity generating block 1451 performs an XOR operation on data strips to generate a parity strip. Where data strips in a strip group are transferred to storage media 1200, ECC generating block 1452 generates ECC information for the respective data strips and corresponding parity strips. As ECC information is generated with respect to each of the data and parity strips, it is added to the strips constituting a full-stripe-write unit.

In some embodiments, parity generating block 1451 and ECC generating block 1452 are included within flash memory controller 1450. However, parity generating block 1451 and ECC generating block 1452 can be placed outside flash memory controller 1450. Alternatively, ECC generating block 1452 can also be included within each flash memory device of storage media 1200.

In some embodiments, host interface 1410 implements a computer bus standard, a storage bus standard, an iFCPPeripheral bus standard, or a combination of two or more such standards. Examples of computer bus standards include S-100 bus, Mbus, Smbus, Q-Bus, ISA, Zorro II, Zorro III, CAMAC, FASTBUS, LPC, EISA, VME, VXI, NuBus, TURBOchannel, MCA, Sbus, VLB, PCI, PXI, HP GSC bus, CoreConnect, InfiniBand, UPA, PCI-X, AGP, PCIe, Intel QuickPath Interconnect, and Hyper Transport. Examples of storage bus standards include ST-506, ESDI, SMD, Parallel ATA, DMA, SSA, HIPPI, USB MSC, FireWire (1394), Serial ATA, eSATA, SCSI, Parallel SCSI, Serial Attached SCSI, Fibre Channel, iSCSI, SAS, RapidIO, and FCIP. Examples of iFCPPeripheral bus standards include Apple Desktop Bus, HIL, MIDI, Multibus, RS-232, DMX512-A, EIA/RS-422, IEEE-1284, UNI/O, 1-Wire, I2C, SPI, EIA/RS-485, USB, Camera Link, External PCIe, Light Peak, and Multidrop Bus.

Figure 3:
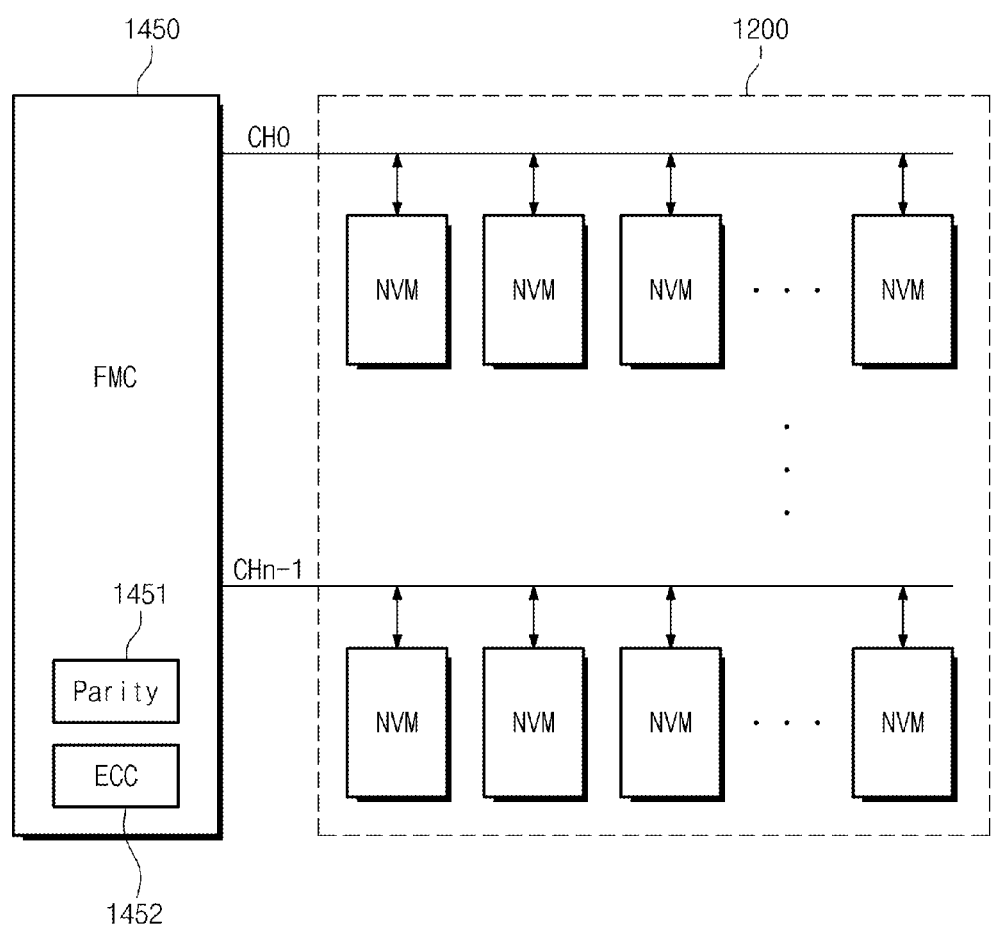
FIG. 3 is a block diagram of storage media illustrated in FIG. 2 according to an embodiment of the inventive concept.

FIG. 3 is a block diagram of storage media 1200 illustrated in FIG. 2 according to an embodiment of the inventive concept.

Referring to FIG. 3, storage media 1200 are connected with flash memory controller (FMC) 1450 of SSD controller 1400 via channels CH0 through CHn−1. Each of channels CH0 through CHn−1 is connected with a plurality of non-volatile memory devices NVM. Non-volatile memory devices NVM can be, for example, flash memory devices. Alternatively, they could be, for example, phase change RAMs (PRAMs), ferroelectric memory device (FeRAMs), or magnetoresistive RAMs (MRAMs).

Figure 4:
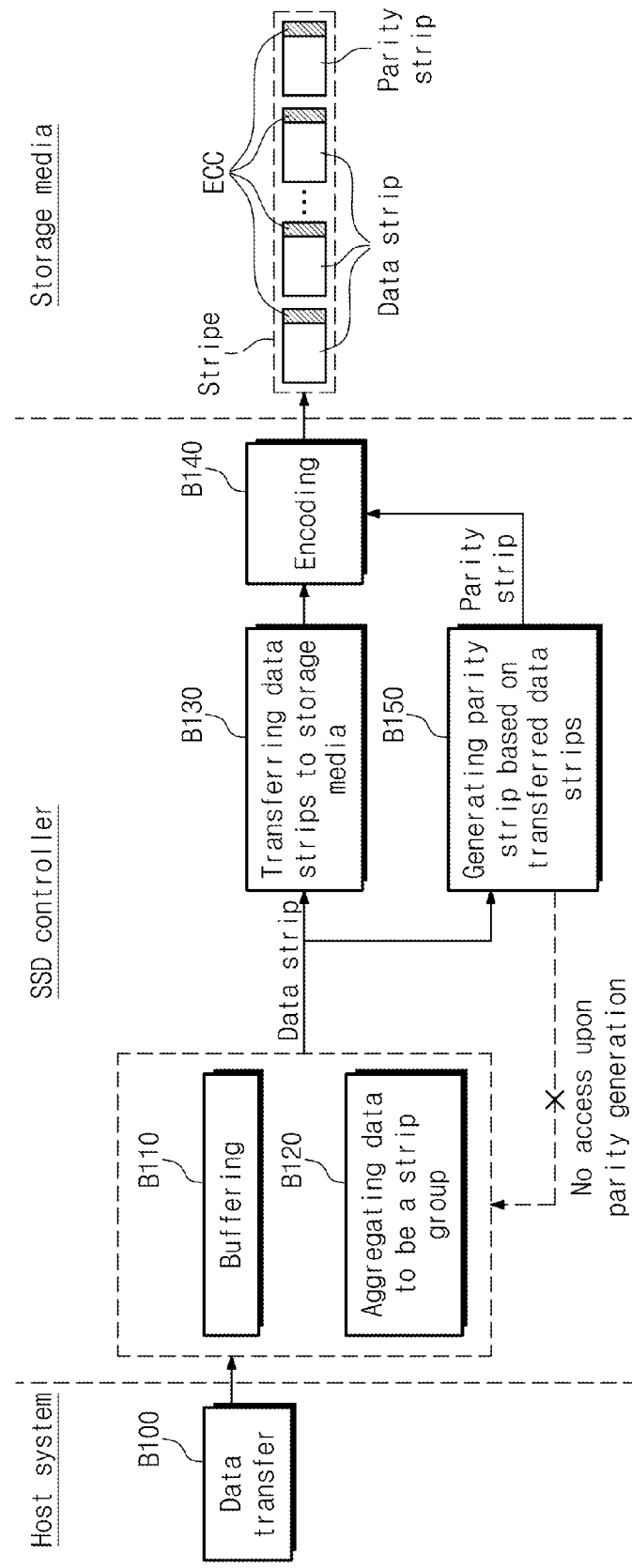
FIG. 4 is a diagram for describing a full-stripe-write method of a data storage device according to an embodiment of the inventive concept.

FIG. 4 is a diagram for describing a full-stripe-write method of a data storage device according to an embodiment of the inventive concept. In the description that follows, example method steps are indicated by parentheses.

Referring to FIG. 4, host system 2000 sends data to be stored in data storage device 1000 in a random or sequential order (B100). Data storage device 1000 temporarily stores the data randomly or sequentially transferred from host system 2000 in buffer memory 1420 (B110). Addresses of the data transferred from host system 2000 are managed by processing unit 1430 (or an FTL) to constitute a strip group (B120). Data stored in buffer memory 1420 is aggregated into one or more strip groups via an address mapping of the FTL. The aggregating of data into one or more strip groups can be performed by an address mapping between logical addresses and physical addresses, not by a transfer of data.

After at least one strip group is prepared, data (or, data strips) of the at least one strip group stored in buffer memory 1420 are sent to storage media 1200 sequentially under the control of processing unit 1430 (B130). While each of the data strips of the at least one strip group is being transferred to storage media 1200, encoding of each of the data strips in the at least one strip group can be performed via ECC generating block 1452 (B140). For example, as illustrated in FIG. 4, ECC information can be added to one data strip. The ECC information is used to correct errors of a corresponding data strip, and the error correction capacity (or, a bit number of ECC information) can be determined according to the number of data bits stored in one cell.

Further, where each of the data strips of the at least one strip group is sent to storage media 1200, parity generating block 1451 generates a parity strip by performing an XOR operation on the data strips in the at least one strip group (B150).

The parity strip can be sent to storage media 1200 after the data strips of the at least one strip group are all transferred to storage media 1200.

An encoding operation of a parity strip transferred to storage media 1200 is carried out via ECC generating block 1452 (B140). That is, ECC information is added to one parity strip. The parity strip is used to improve the reliability on data of one stripe. In particular, the parity strip may be generated to recover an unreadable strip among data and parity strips in one stripe. Consequently, as illustrated in FIG. 4, a stripe stored in storage media 1200 is formed of a plurality of data strips and one parity strip, and ECC information is added to each strip.

Because a parity strip is generated when data strips in a strip group are sent to storage media 1200, as illustrated in FIG. 4, generation of a parity strip in one stripe can be performed without an additional/further access to buffer memory 1420 and/or an increase in traffic of buffer memory 1420. In other words, because no additional access to buffer memory 1420 is performed to generate a parity strip, the traffic of buffer memory 1420 is maintained constantly before and after a parity strip used to improve the data reliability is generated.

Figure 5:
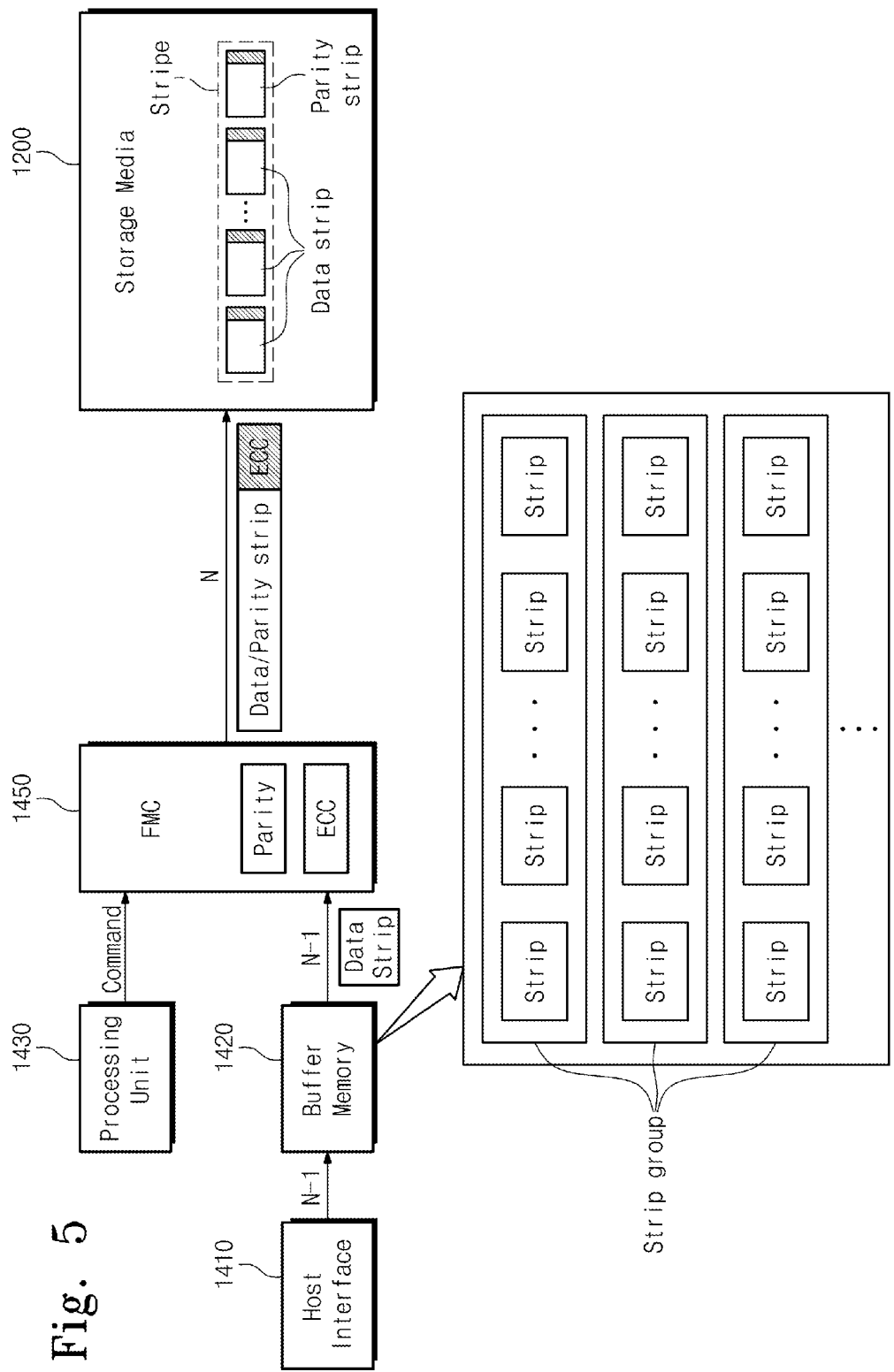
FIG. 5 is a block diagram for describing a data flow of a full-stripe-write method of a data storage device according to an embodiment of the inventive concept.

FIG. 5 is a block diagram for describing a data flow of a full-stripe-write method of a data storage device according to an embodiment of the inventive concept.

Referring to FIG. 5, data provided from host system 2000 is stored in buffer memory 1420 via host interface 1410. Data stored in buffer memory 1420 is data provided according to a random or sequential write request of host system 2000. For example, buffer memory 1420 can be accessed (N−1) times to store data transferred from host system 2000 in buffer memory 1420. As illustrated in FIG. 5, data stored in buffer memory 1420 is aggregated to form strip groups. Aggregation of data into strip groups can be performed by an address mapping of a flash translation layer instead of a transfer of data. The number of strips (or, data strips) in one strip group can be determined variously according to different applications.

After one or more strip groups are configured, data (or, data strips) of a strip group is sent to storage media 1200 under the control of processing unit 1430. Flash memory controller 1450 transfers a data strip to storage media 1200 in response to a command provided from processing unit 1430. ECC generating block 1452 of flash memory controller 1450 generates ECC information on the transferred data strip and adds the ECC information to the data strip. In other words, ECC information is added to each of data strips. While data strips in one strip group are sequentially transferred to storage media 1200, parity generating block 1451 of flash memory controller 1450 generates a parity strip by performing an XOR operation on transferred data strips. The parity strip thus generated is sent to storage media 1200. Similarly, ECC information is added to the parity strip. A stripe stored in storage media 1200 is formed of data strips and a parity strip.

As indicated by the above description, generation of a parity strip does not necessitate an additional access to buffer memory 1420, so generating a parity strip does not cause an increase in traffic of buffer memory 1420.

Figure 6:
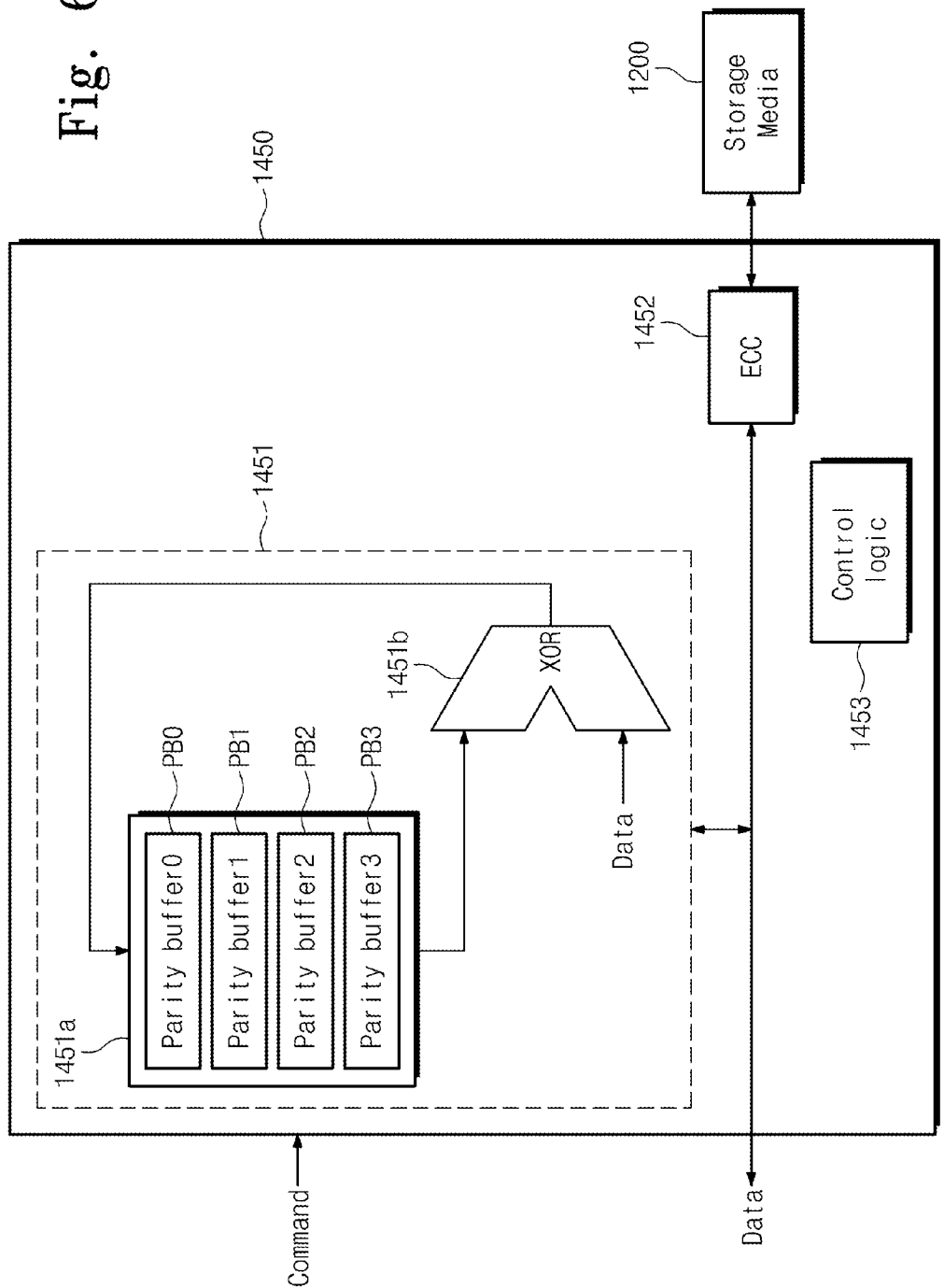
FIG. 6 is a block diagram of a flash memory controller illustrated in FIG. 2 according to an embodiment of the inventive concept.

FIG. 6 is a block diagram of flash memory controller 1450 of FIG. 2 according to an embodiment of the inventive concept.

Referring to FIG. 6, flash memory controller 1450 operates responsive to a command provided from processing unit 1430, and it comprises parity generating block 1451, ECC generating block 1452, and control logic block 1453. In accordance some embodiments, a full-stripe-write operation provides commands (e.g., XWRITE, PBWRITE, XREAD, PBREAD, XCOPYBACK, XLOAD, PBREST, etc.) that are defined between flash memory controller 1450 and processing unit 1430. Some of the defined commands are commands accompanying an XOR operation for the full-stripe-write operation, as described in further detail below.

Parity generating block 1451 generates a parity strip based on data (e.g., data strips) transferred from buffer memory 1420 to storage media 1200. Accordingly, it is not necessary to additionally access buffer memory 1420 to generate a parity strip. Parity generating block 1451 comprises a memory 1451a formed of four parity buffers PB0 through PB3 and XOR logic 1451b, but the number of parity buffers PB0 through PB3 can be modified in other embodiments. Memory 1451a, for example, can be an SRAM. XOR logic 1451b performs an XOR (or, exclusive OR) operation on a data strip from buffer memory 1420 and a previous parity strip stored in a selected parity buffer. A new parity strip is generated as a result of the exclusive OR operation and stored in the selected parity buffer, i.e., a parity buffer in which a previous parity strip is stored. Parity buffers PB0 through PB3 of memory 1451a are selected by a parity buffer number (or, a parity buffer address) included in a command. A parity strip stored in a selected parity buffer is sent to storage media 1200 or buffer memory 1420 according to a command from processing unit 1430. Parity generating block 1451 is called an XOR accelerator and comprises logic for controlling overall operations of parity generating block 1451.

ECC generating block 1452 generates ECC information for data strips transferred from buffer memory 1420 to storage media 1200. Likewise, ECC generating block 1452 generates ECC information on parity strips transferred from parity generating block 1451 to storage media 1200. ECC generating block 1452 can be configured to correct errors of data (or, data/parity strip) read out from storage media 1200. ECC generating block 1452 can be configured to buffer a strip transferred from storage media 1200, and the buffered strip can be sent to parity generating block 1451 to buffer memory 1420 after an error detecting and correcting process. If the buffered strip is judged to be uncorrectable, generation of a read error may be notified to processing unit 1430. The construction of ECC generating block 1452 can be modified in other embodiments. For example, ECC generating block 1452 can be implemented without buffering.

As described above, ECC information can be used to correct errors of a corresponding data/parity strip, and the parity strip can be used to recover any unreadable strip of data and parity strips in a stripe. Herein, an unreadable strip may represent a strip that is not corrected according to ECC information.

Figure 7:
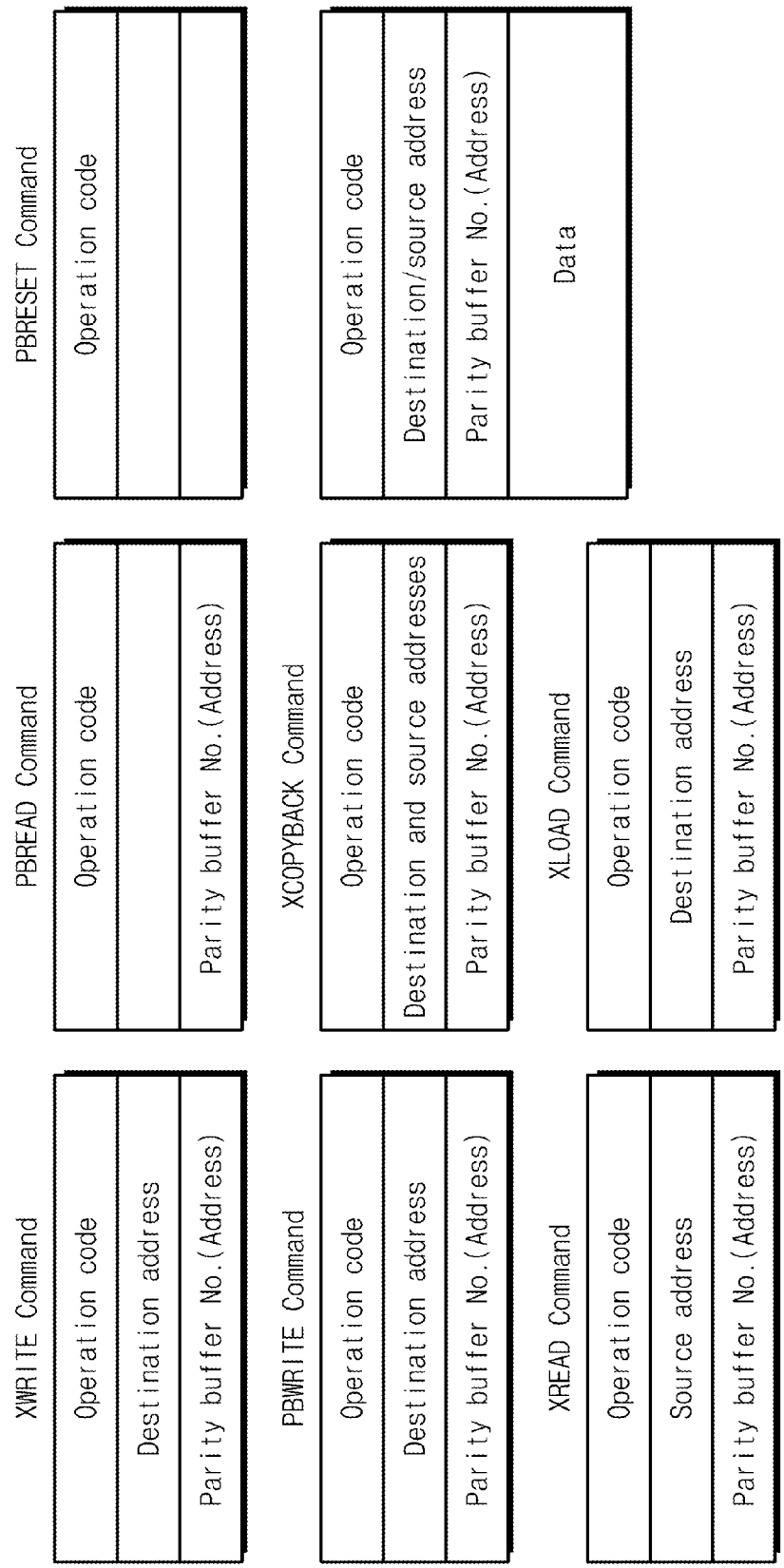
FIG. 7 is a diagram for describing commands of a data storage device according to an embodiment of the inventive concept.

FIG. 7 is a diagram for describing commands of a data storage device according to an embodiment of the inventive concept.

Referring to FIG. 7, commands transferred from processing unit 1430 to flash memory controller 1450 comprise an XWRITE command, a PBWRITE command, an XREAD command, a PBREAD command, an XCOPYBACK command, an XLOAD command, and a PBRESET command. The commands can comprise part or all of an operation code, a destination address, a source address, and a parity buffer number (or, address). For example, the XWRITE, PBWRITE, and XLOAD commands may include an operation code, a destination address, and a parity buffer number (or, address). The XREAD command can comprise an operation code, a source address, and a parity buffer number (or, address). The XCOPYBACK command can comprise an operation code, destination and source addresses, and a parity buffer number (or, address). The PBRESET and PBREAD commands can comprise an operation code and a parity buffer number (or, address). On the other hand, as illustrated in FIG. 7, a command may be set to include a data strip to be transferred.

Figure 8:
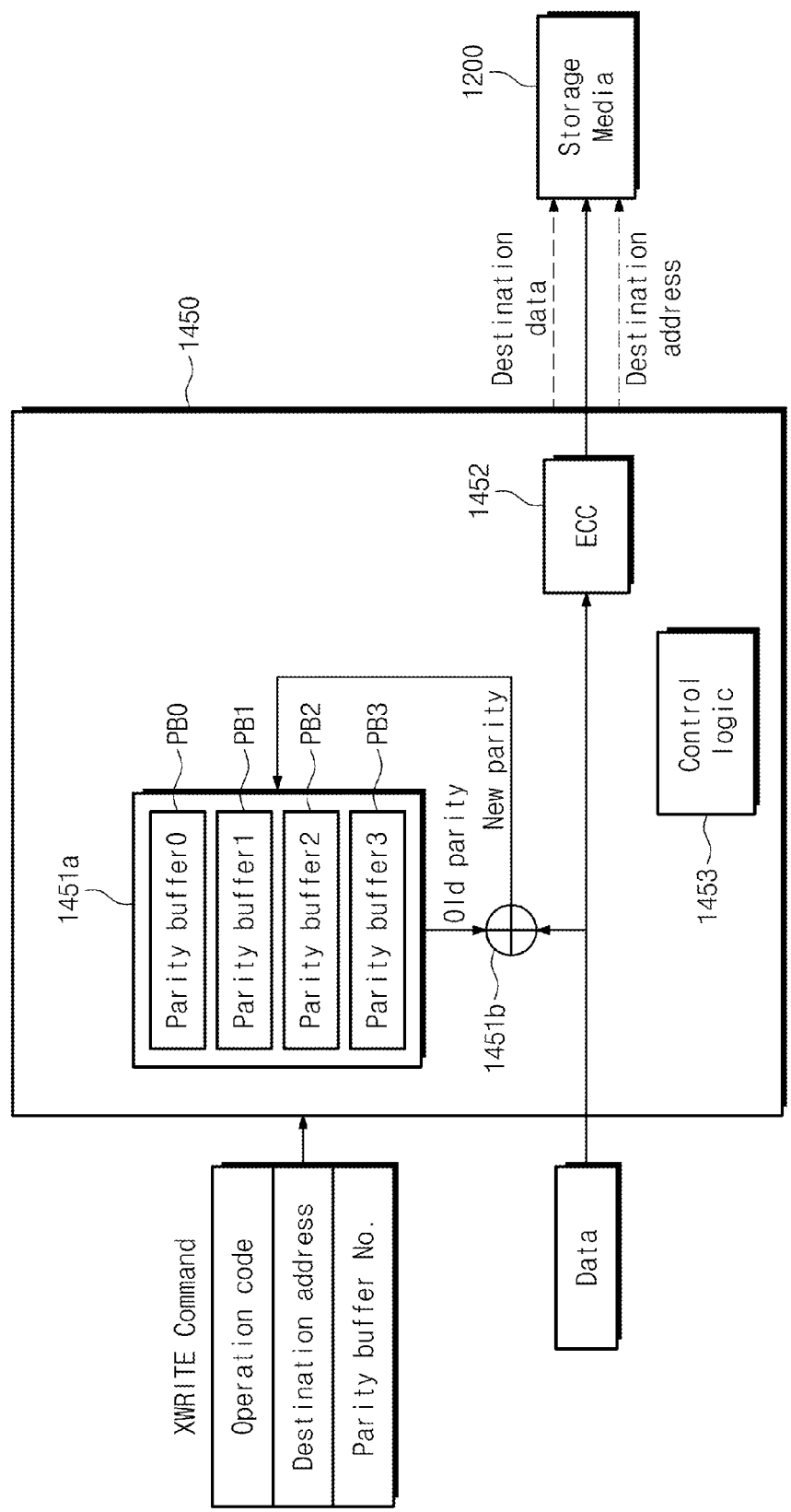
FIG. 8 is a diagram for describing an operation of a flash memory controller corresponding to an XWRITE command of a data storage device according to an embodiment of the inventive concept.

FIG. 8 is a diagram for describing an operation of a flash memory controller corresponding to an XWRITE command of a data storage device according to an embodiment of the inventive concept.

Referring to FIG. 8, processing unit 1430 sends an XWRITE command to flash memory controller 1450 as occasion demands (e.g., when at least one strip group is prepared by an address mapping). The XWRITE command comprises an operation code, a destination address, and a parity buffer number (or, address). The destination address can be used to designate storage space of storage media 1200 to which a data strip transferred from buffer memory 1420 is sent and to select a parity buffer to which a parity strip generated by XOR logic 1451b is stored. When the XWRITE command is received, a data strip provided from buffer memory 1420 may be transferred to storage media 1200. At the same time, XOR logic 1451b performs an XOR operation on the transferred data strip and a previous (or, old) parity strip of a parity buffer designated by the parity buffer number. A result of the XOR operation, i.e., a new parity strip, is stored in the parity buffer designated by the parity buffer number. Further, ECC generating block 1452 generates ECC information based on the transferred data strip. The ECC information is added to the data strip. The XWRITE command can be a data strip transferring command accompanying generation of a parity strip, i.e., a command accompanying an XOR operation for a full-stripe-write operation.

In some embodiments, the transfer of a data strip to flash memory controller 1450 can be performed under the control of processing unit 1430 or flash memory controller 1450.

Figure 9:
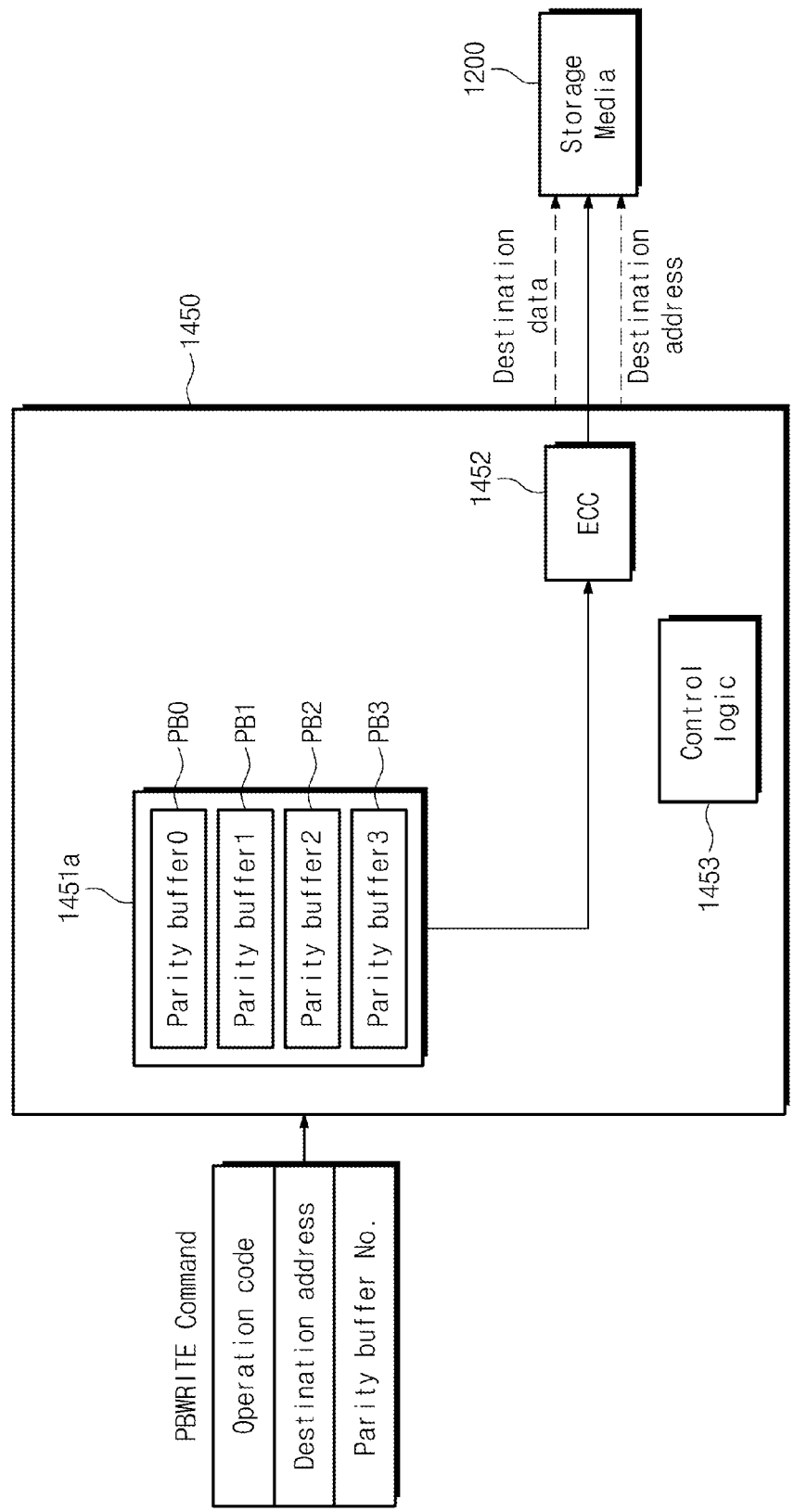
FIG. 9 is a diagram for describing an operation of a flash memory controller corresponding to a PBWRITE command of a data storage device according to an embodiment of the inventive concept.

FIG. 9 is a diagram for describing an operation of a flash memory controller corresponding to a PBWRITE command of a data storage device according to an embodiment of the inventive concept.

Referring to FIG. 9, processing unit 1430 transfers a PBWRITE command to flash memory controller 1450, e.g., when data strips in a strip group are all transferred. The PBWRITE command comprises an operation code, a destination address, and a parity buffer number (or, address). A parity strip of a parity buffer designated by the parity buffer number is sent to storage media 1200 when the PBWRITE command is received (e.g., when the PBWRITE command is provided to a parity generating block 1451). ECC generating block 1452 generates ECC information according to a transferred parity strip. The ECC information is added to the parity strip. The PBWRITE command can be a command for transferring a parity strip stored in a parity buffer to storage media 1200.

Figure 10:
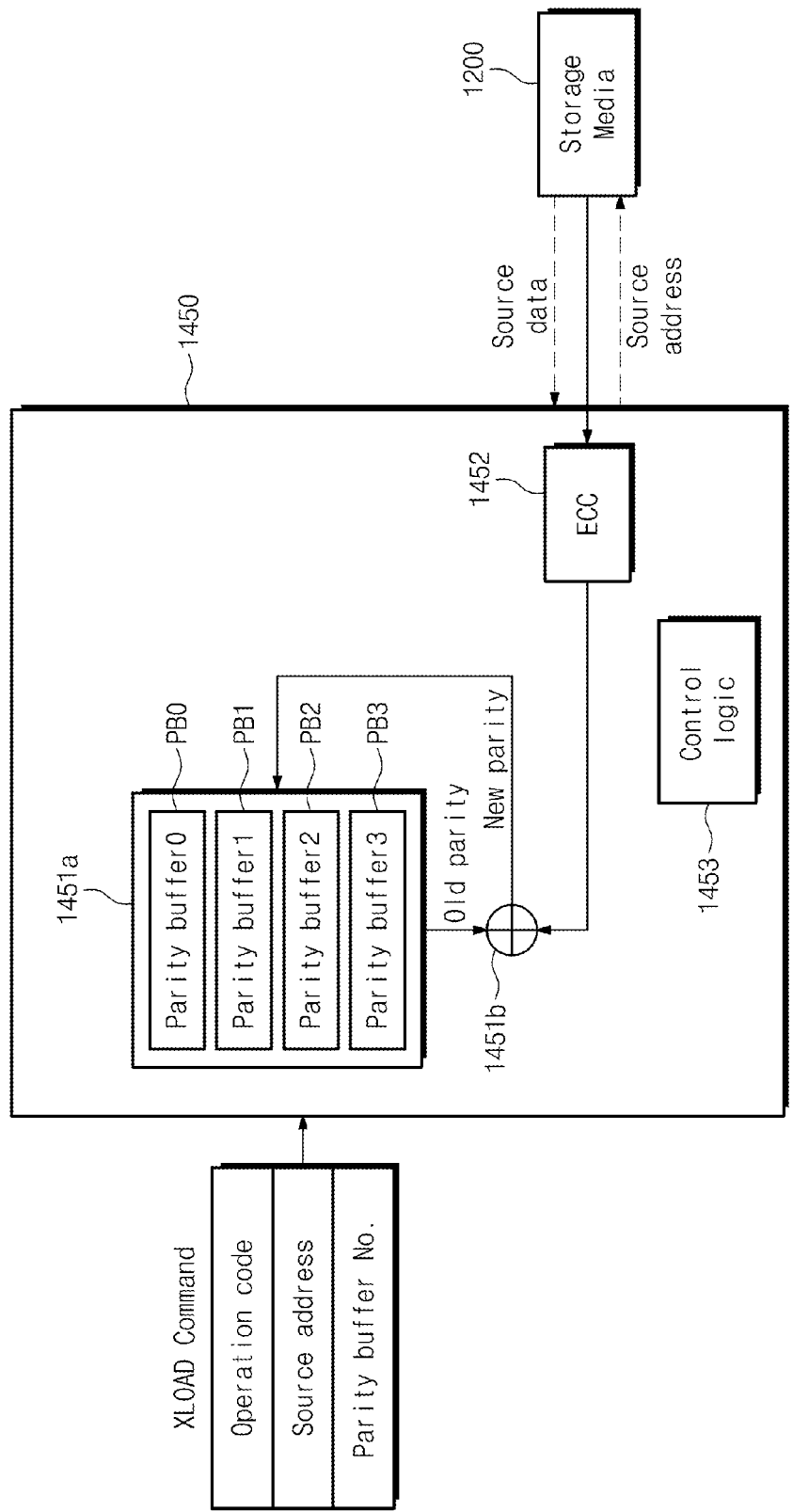
FIG. 10 is a diagram for describing an operation of a flash memory controller corresponding to an XLOAD command of a data storage device according to an embodiment of the inventive concept.

FIG. 10 is a diagram for describing an operation of a flash memory controller corresponding to an XLOAD command of a data storage device according to an embodiment of the inventive concept.

Referring to FIG. 10, processing unit 1430 transfers an XLOAD command to flash memory controller 1450, e.g., in order to transfer a data or parity strip in a stripe to a parity generating block 1451). The XLOAD command comprises an operation code, a source address, and a parity buffer number (or, address). A data/parity strip designated by the source address is sent to XOR logic 1451b as source data. Where the XLOAD command is provided to flash memory controller 1450, XOR logic 1451b is provided with a parity strip (i.e., an old parity strip) of a parity buffer designated by the parity buffer number. A new parity buffer calculated by XOR logic 1451b is stored in the parity buffer designated by the parity buffer number. An operation of detecting errors of source data read from storage media 1200 is performed by ECC generating block 1452. The XLOAD command can be a command accompanying an XOR operation.

Figure 11:
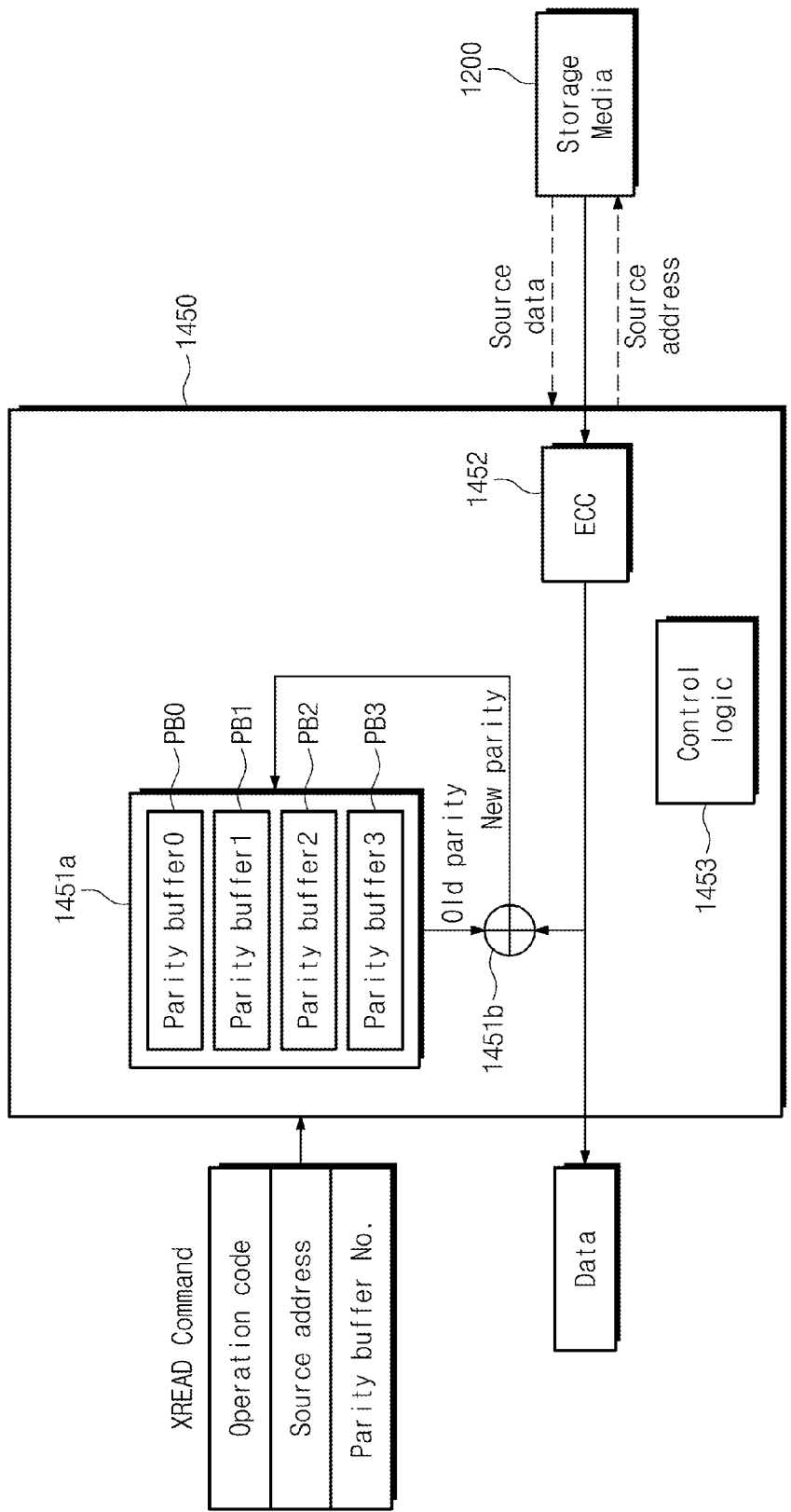
FIG. 11 is a diagram for describing an operation of a flash memory controller corresponding to an XREAD command of a data storage device according to an embodiment of the inventive concept.

FIG. 11 is a diagram for describing an operation of a flash memory controller corresponding to an XREAD command of a data storage device according to an embodiment of the inventive concept.

Referring to FIG. 11, processing unit 1430 transfers an XLOAD command to flash memory controller 1450, e.g., in order to transfer a data or parity strip in a stripe to parity generating block 1451 and to buffer memory 1420 (or, a cache memory of an SSD controller)). The XREAD command comprises an operation code, a source address, and a parity buffer number (or, address). A data/parity strip designated by the source address is sent to XOR logic 1451b and to an outside (e.g., a buffer memory 1420 or a cache memory of an SSD controller). Where the XREAD command is provided to flash memory controller 1450, XOR logic 1451b is provided with a parity strip (i.e., an old parity strip) of a parity buffer designated by the parity buffer number. A new parity strip calculated by XOR logic 1451b is stored in the parity buffer designated by the parity buffer number. An operation of detecting and correcting errors of source data read from storage media 1200 is performed by ECC generating block 1452. The XREAD command is a command accompanying an XOR operation (or, parity generation).

Figure 12:
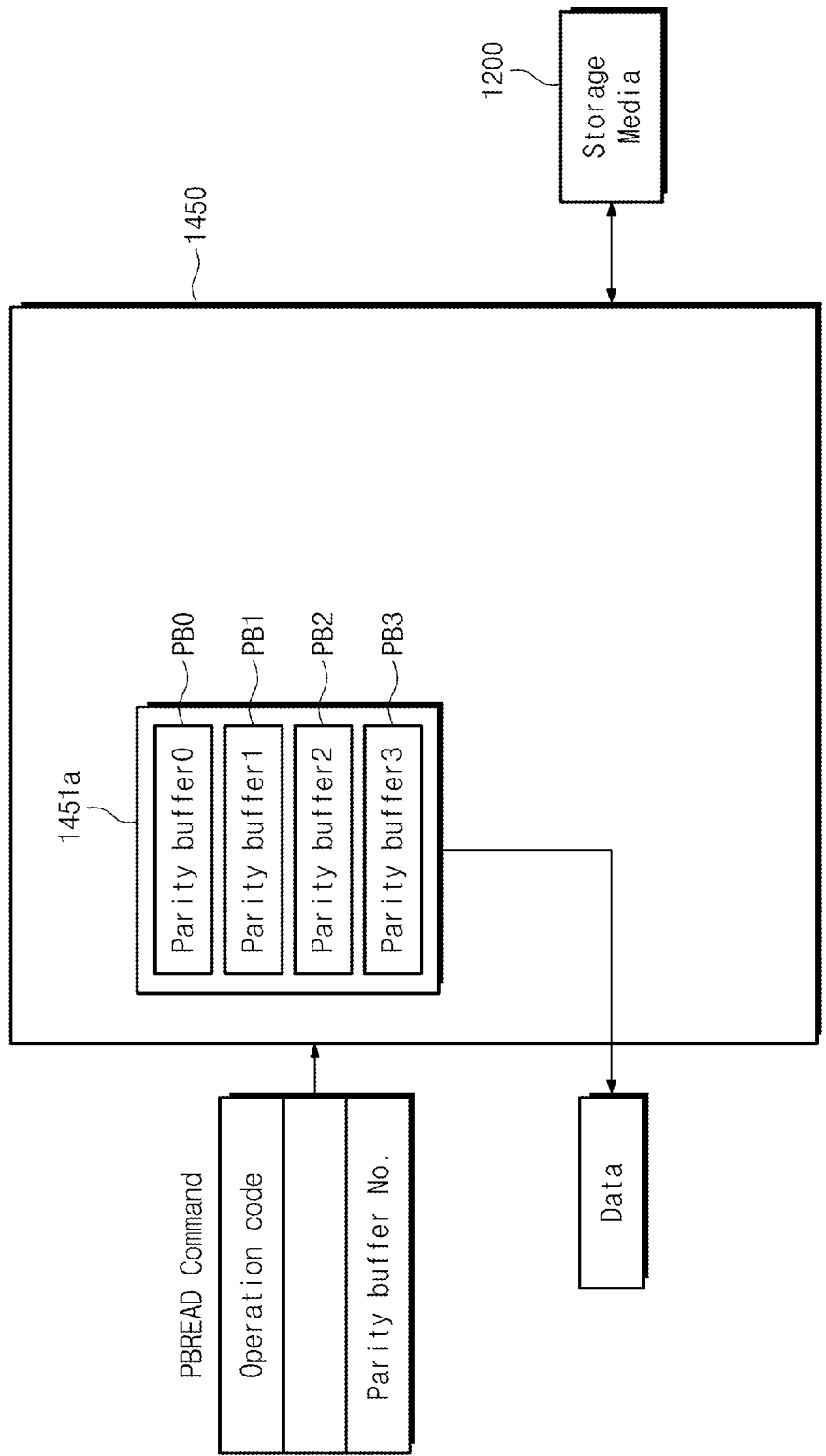
FIG. 12 is a diagram for describing an operation of a flash memory controller corresponding to a PBREAD command of a data storage device according to an embodiment of the inventive concept.

FIG. 12 is a diagram for describing an operation of a flash memory controller corresponding to a PBREAD command of a data storage device according to an embodiment of the inventive concept.

Referring to FIG. 12, processing unit 1430 transfers a PBREAD command to flash memory controller 1450, e.g., in order to read a parity strip from a parity buffer. The PBREAD command comprises an operation code and a parity buffer number (or, address). Where the PBREAD command is provided to flash memory controller 1450, a parity strip designated by the parity buffer number is sent to buffer memory 1420. At this time, no access to storage media 1200 is made.

Figure 13:
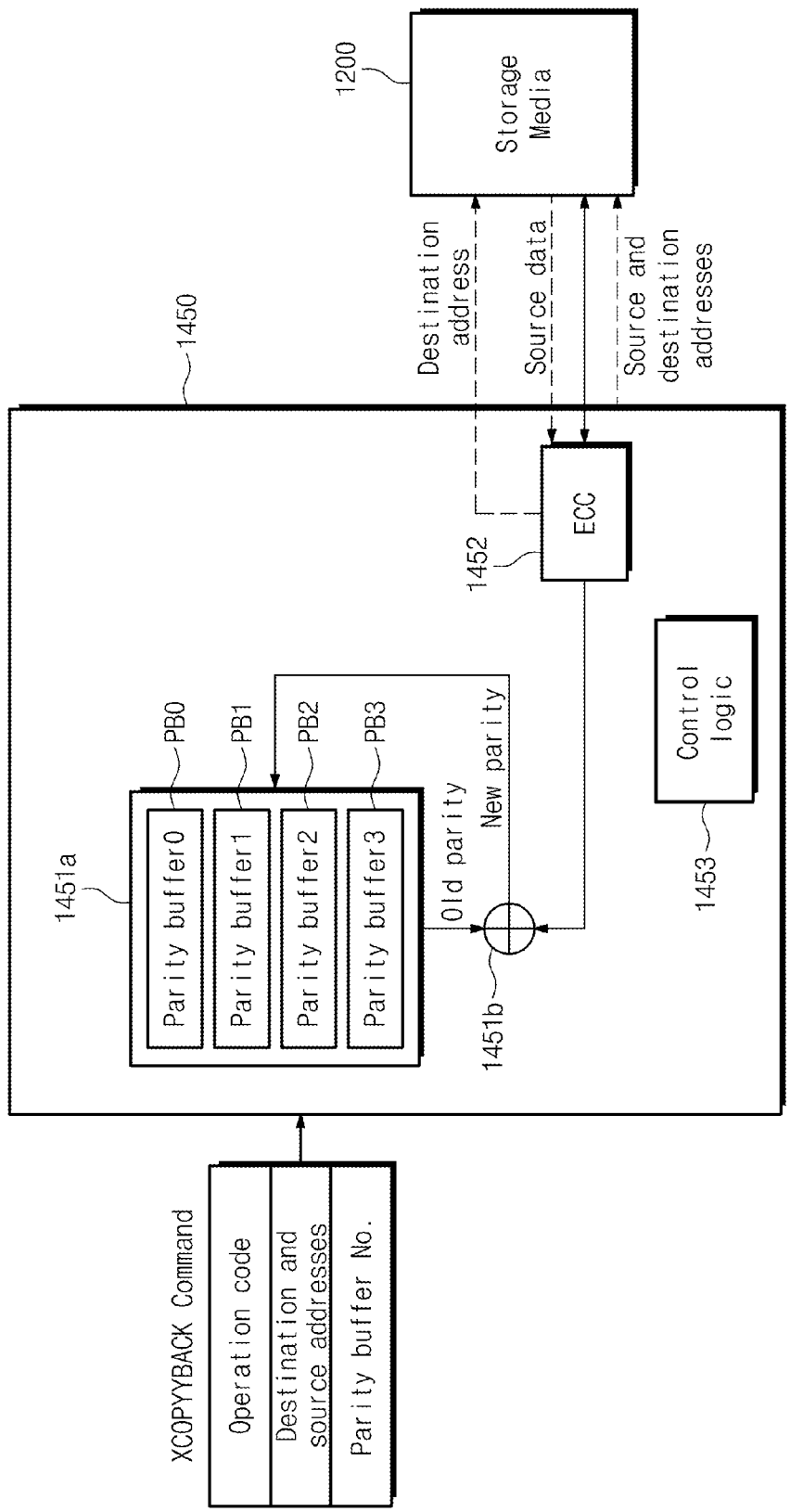
FIG. 13 is a diagram for describing an operation of a flash memory controller corresponding to an XCOPYBACK command of a data storage device according to an embodiment of the inventive concept.

FIG. 13 is a diagram for describing an operation of a flash memory controller corresponding to an XCOPYBACK command of a data storage device according to an embodiment of the inventive concept.

Referring to FIG. 13, processing unit 1430 transfers an XCOPYBACK command to flash memory controller 1450. The XCOPYBACK command may include an operation code, destination and source addresses, and a parity buffer number (or, address). The source address is used to designate a data/parity strip of a source stripe, and the destination address is used to designate a strip of a destination stripe. Where the XCOPYBACK command is provided to flash memory controller 1450, source data is read from storage media 1200, and the read source data is sent to XOR logic 1451b. At the same time, decoding and encoding operations on the read data are made via an ECC generating block 1452, and the read data is sent to storage media 1200 as destination data. The XCOPYBACK command is a command accompanying an XOR operation.

Figure 14:
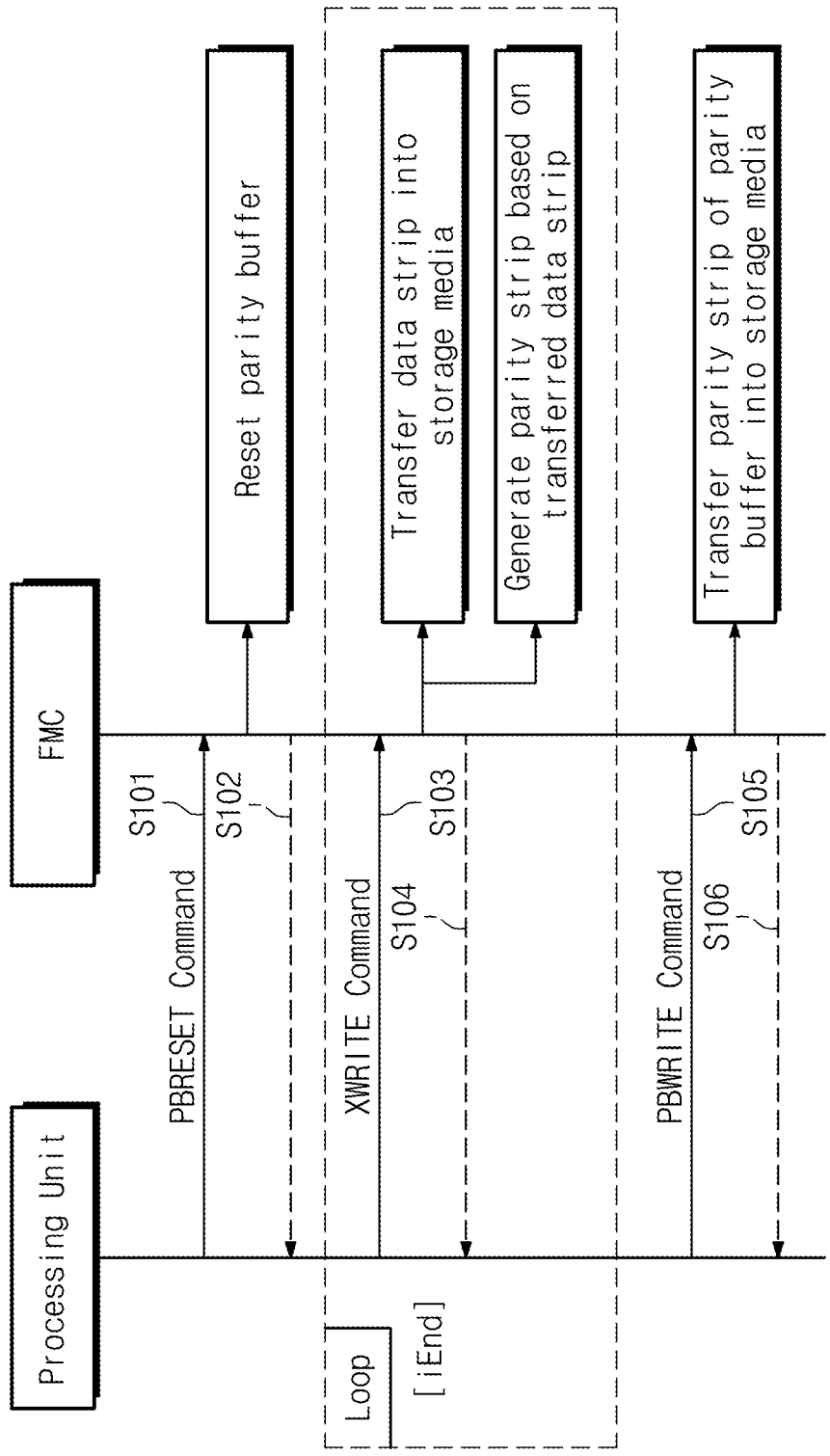
FIG. 14 is a universal modeling language (UML) sequence diagram for describing a full-stripe-write method of a data storage device according to an embodiment of the inventive concept.
Figure 15:
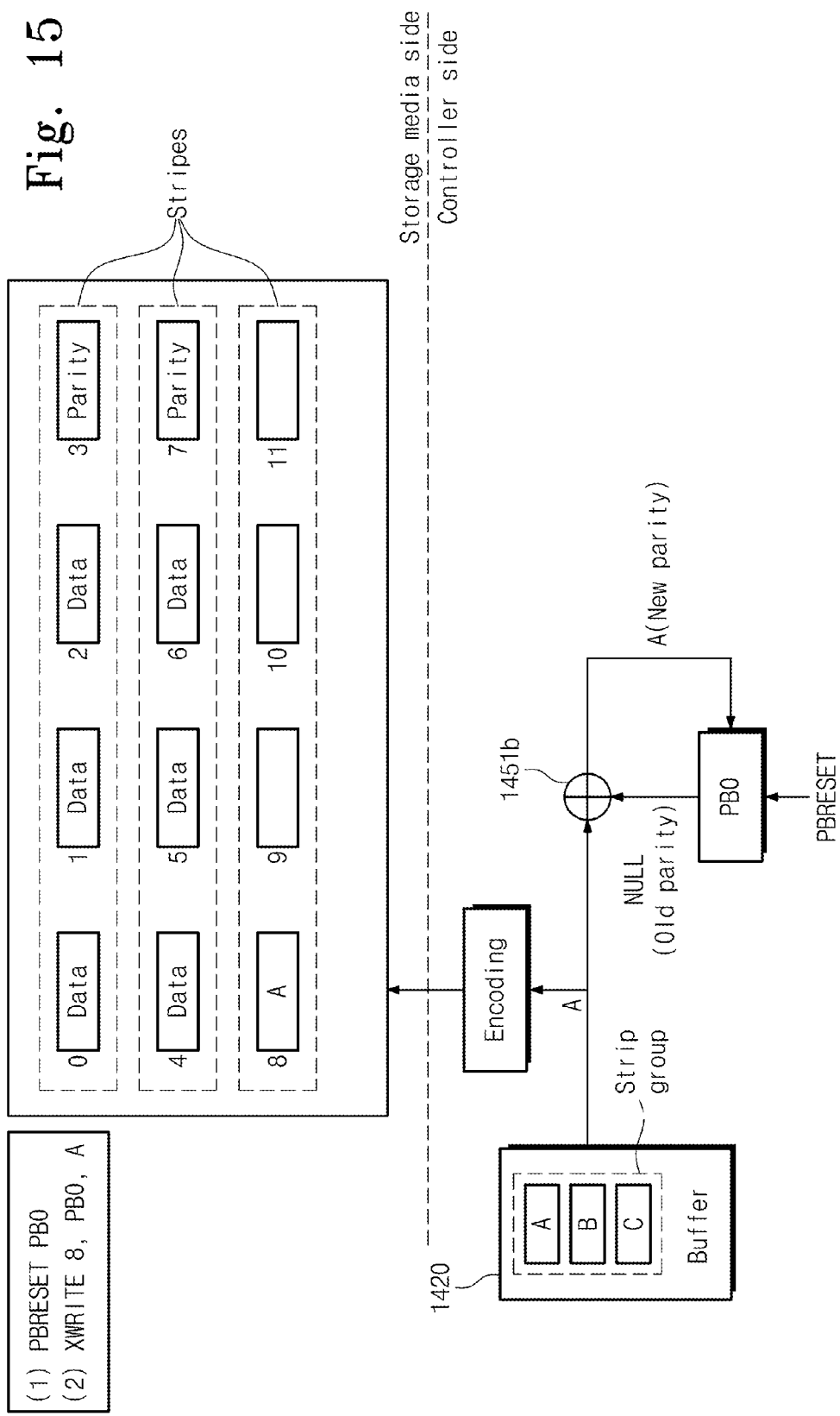
FIGS. 15 through 17 are diagrams of data flows of the full-stripe-write method illustrated in FIG. 14 according to an embodiment of the inventive concept.
Figure 16:
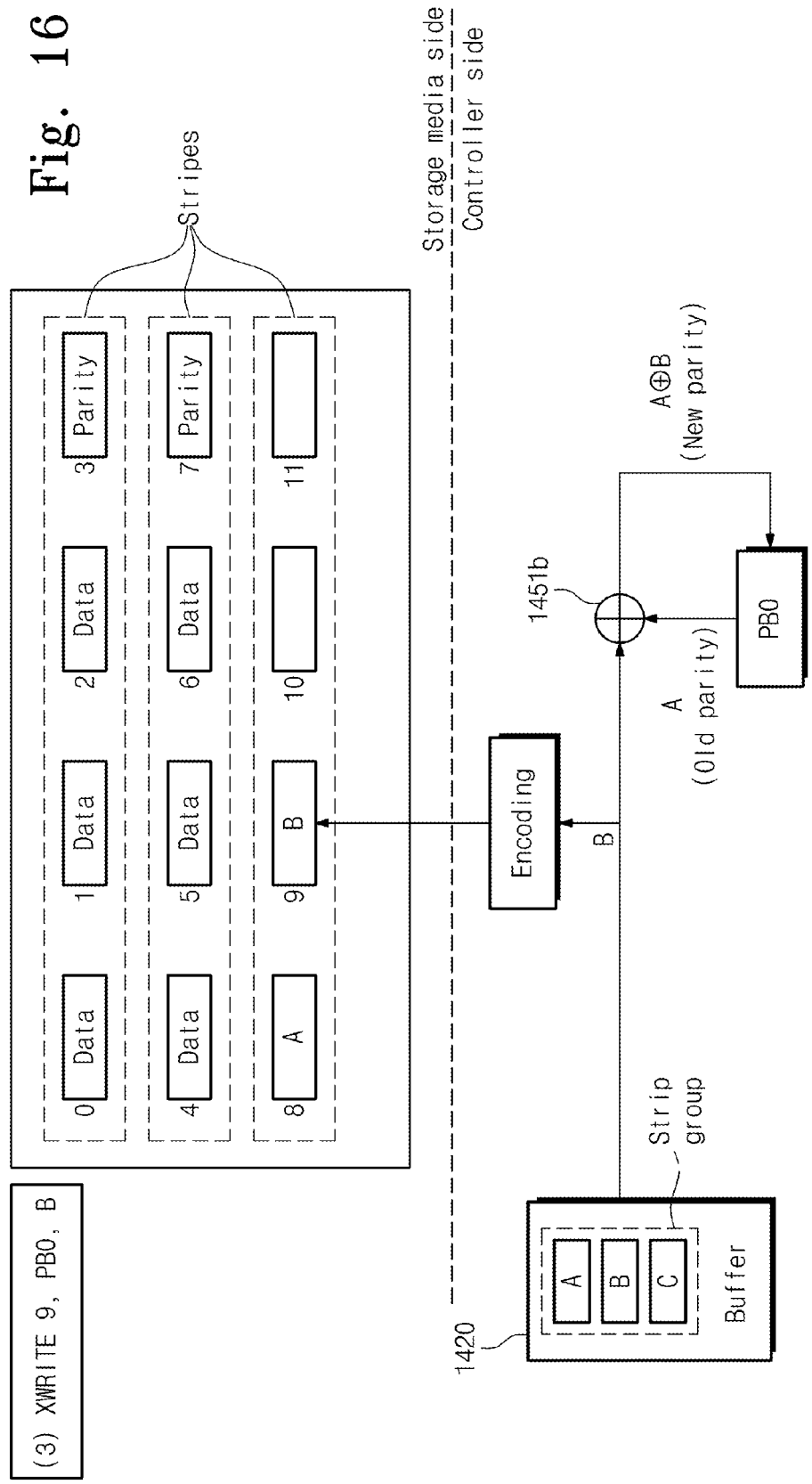
Figure 17:
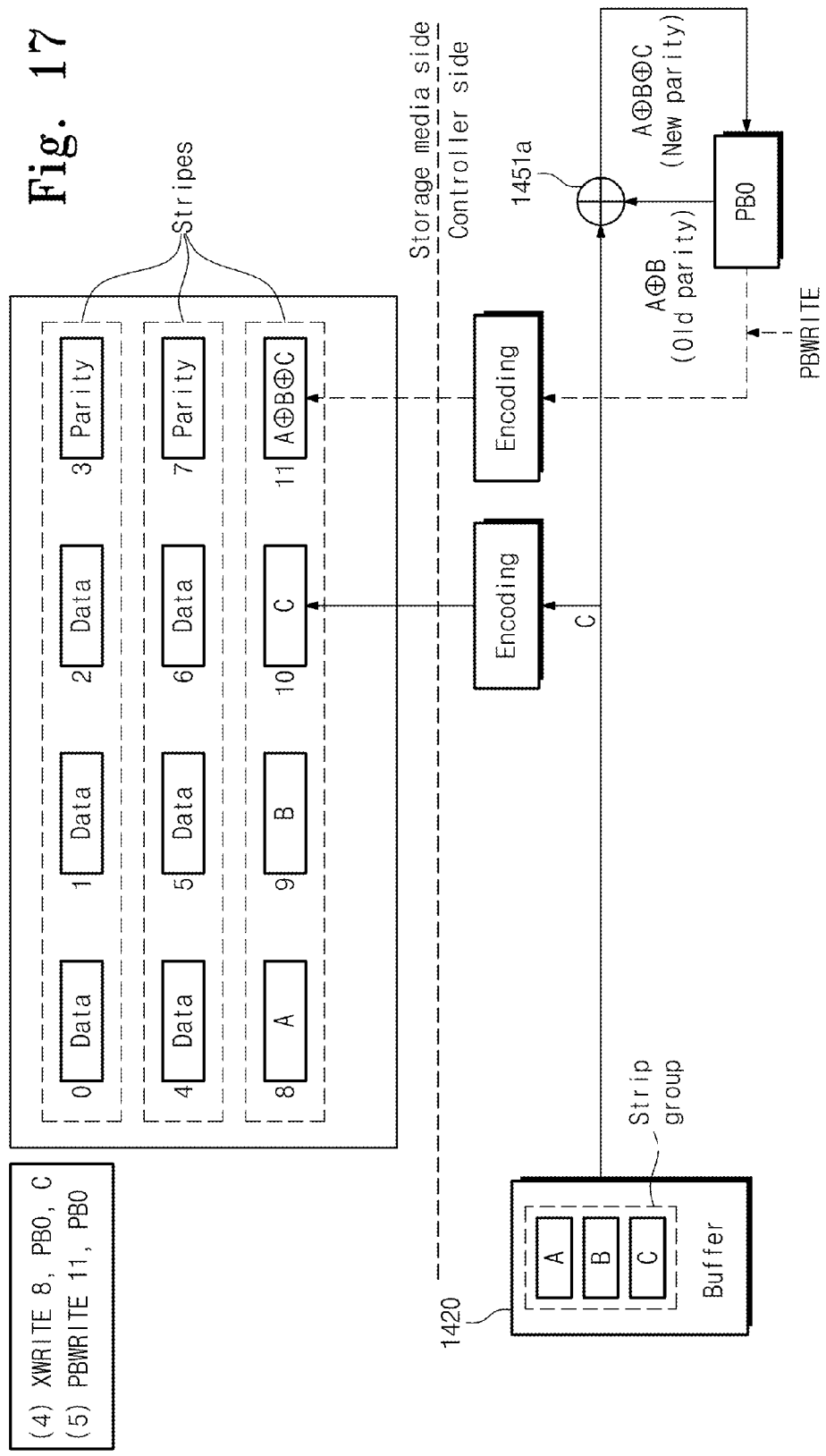

FIG. 14 is a UML sequence diagram for describing a full-stripe-write method of a data storage device according to an embodiment of the inventive concept, and FIGS. 15 through 17 are diagrams of data flows for the full-stripe-write method illustrated in FIG. 14. For ease of description, it is assumed that one strip group is formed of three data strips (e.g., A, B, and C).

As described above, data stored in buffer memory 1420 can be aggregated to constitute one or more strips by an address mapping of processing unit 1430 (or, a flash translation layer FTL). Once the strip group(s) is prepared, processing unit 1430 performs a full-stripe-write operation. First, processing unit 1430 sends a PBRESET command to flash memory controller 1450 (S101). Flash memory controller 1450 resets a parity buffer (e.g., PB0) in response to the PBRESET command. Parity buffer PB0 is selected by a parity buffer number (or, address) included in the PBRESET command. After parity buffer PB0 is reset, flash memory controller 1450 issues a response on the PBRESET command (S120).

Then, processing unit 1430 transfers an XWRITE command to flash memory controller 1450 (S103). After the XWRITE command is sent to flash memory controller 1450, as illustrated in FIG. 15, one strip A of data strips (e.g., A, B, and C in FIG. 15) in a strip group stored in buffer memory 1420 may be sent to flash memory controller 1450. The transferred data strip A is provided to storage media 1200. At this time, ECC information s added to data strip A through ECC generating block 1452. Data strip A is stored in a storage space corresponding to a destination address (e.g., 8) included in the XWRITE command.

At the same time, as illustrated in FIG. 15, XOR logic 1451b performs an XOR operation on data strip A transferred from buffer memory 1420 to storage media 1200 and an old parity strip (being null data due to initialization) of parity buffer PB0 and generate a new parity strip A. Parity strip A thus generated is stored in the selected parity buffer PB0. After the transfer of the data strip and generation of the parity strip are completed, flash memory controller 1450 sends a response on the XWRITE command (S104).

As illustrated in FIG. 14, the XWRITE command is iteratively sent to flash memory controller 1450 by the number of data strips in the strip group. For example, as illustrated in FIG. 16, a next data strip B is sent to storage media 1200 according to the XWRITE command accompanying parity generation (or, an XOR operation). In this case, XOR logic 1451b performs an XOR operation on data strip B transferred from buffer memory 1420 to storage media 1200 and an old parity strip A of the selected parity buffer PB0 and generates a new parity strip (A⊕B). The parity strip (A⊕B) thus generated is stored in the selected parity buffer PB0. After data strip B is sent, as illustrated in FIG. 17, a last data strip C is sent to storage media 1200 according to the XWRITE command accompanying parity generation (or, an XOR operation). In this case, XOR logic 1451b performs an XOR operation on data strip C transferred from buffer memory 1420 to storage media 1200 and an old parity strip (A⊕B) of the selected parity buffer PB0 and generate a new parity strip (A⊕B⊕C). The parity strip (A⊕B⊕C) thus generated is stored in the selected parity buffer PB0. ECC information is added to the parity strip (A⊕B⊕C) through an ECC generating block 1452.

Referring to FIG. 14, where data strips A, B, and C in the strip group are all transferred, processing unit 1430 sends a PBWRITE command to flash memory controller 1450 (S105). Flash memory controller 1450 responds to the PBWRITE command to transfer the parity strip (A⊕B⊕C) stored in the selected parity buffer PB0 into storage media 1200. After the parity strip (A⊕B⊕C) stored in the selected parity buffer PB0 is sent into storage media 1200, flash memory controller 1450 provides processing unit 1430 with a response to the PBWRITE command (S106). Afterwards, the full-stripe-write operation is ended.

As understood from the above description, where data strips A, B, and C in the strip group is sent to storage media 1200 according to the XWRITE command accompanying the parity generation (or, an XOR operation), the parity strip may be generated without an additional access to buffer memory 1420 (or, without an increase in traffic of buffer memory 1200). As understood from FIG. 17, data strips A, B, and C and the parity strip (A⊕B⊕C) constitute one stripe being a full-stripe-write unit.

Figure 18:
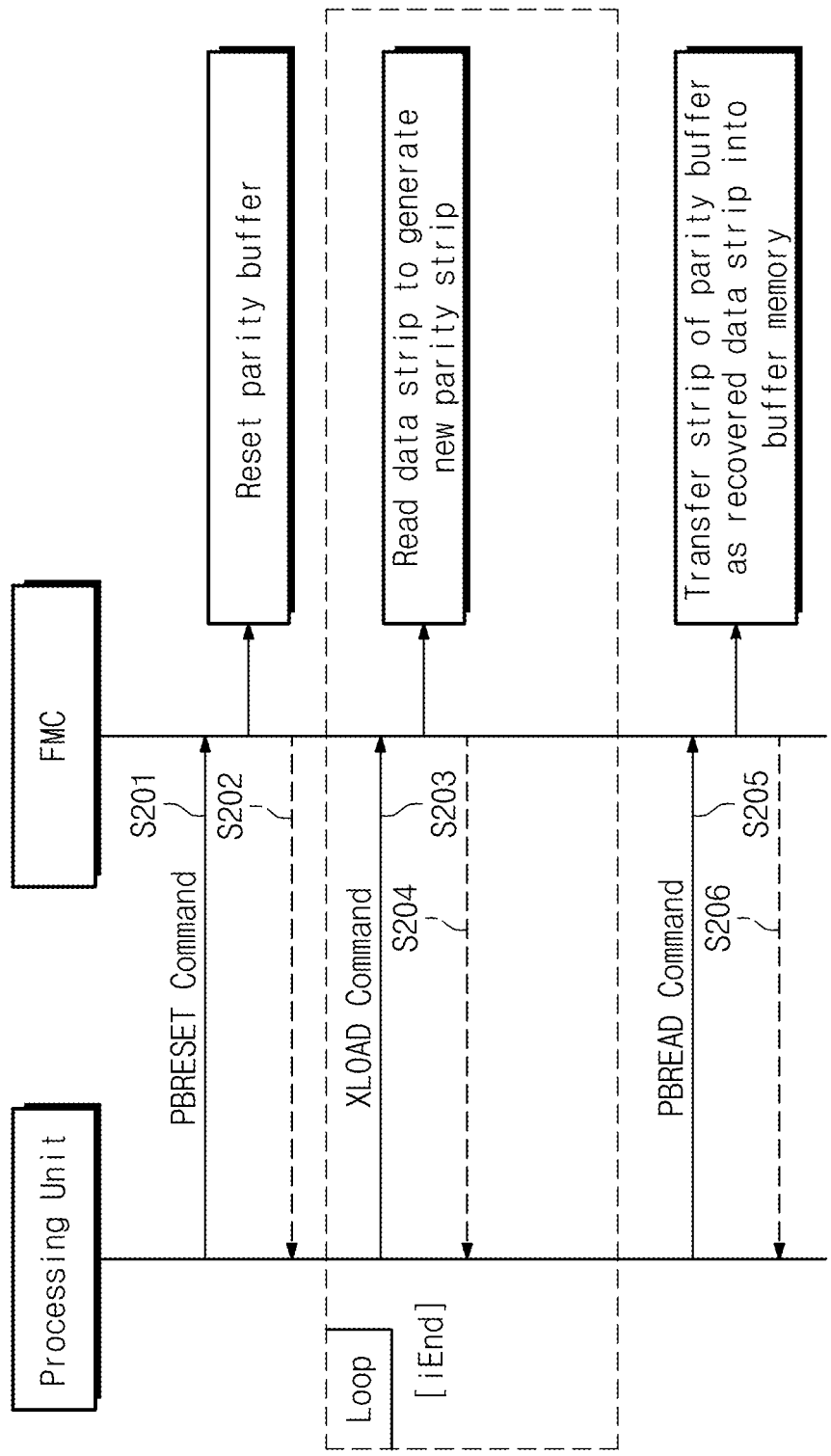
FIG. 18 is a UML sequence diagram for an unreadable data recovering operation of a data storage device according to an embodiment of the inventive concept.
Figure 19:
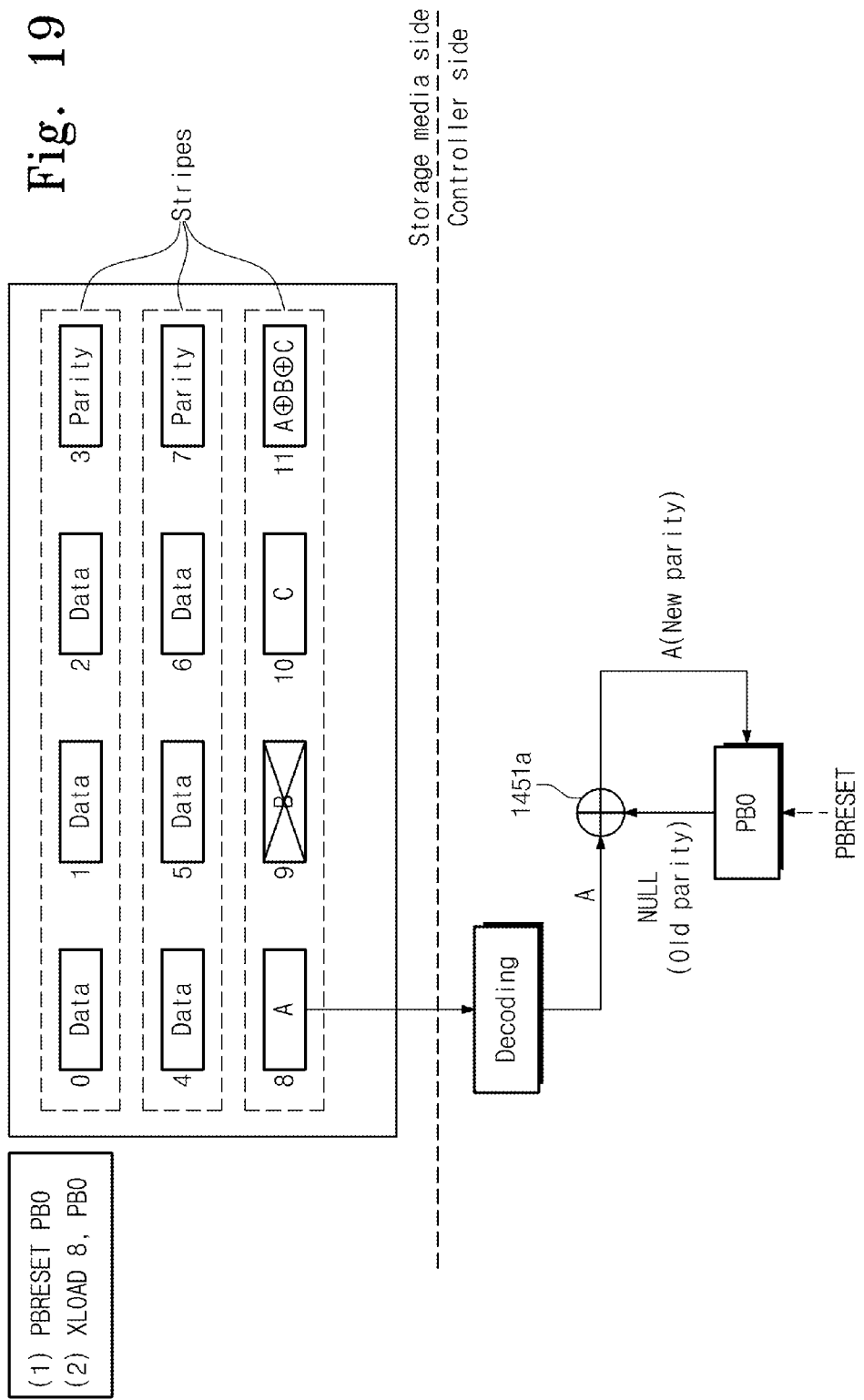
FIGS. 19 to 21 are diagrams of data flows for the unreadable data recovering operation illustrated in FIG. 18.
Figure 20:
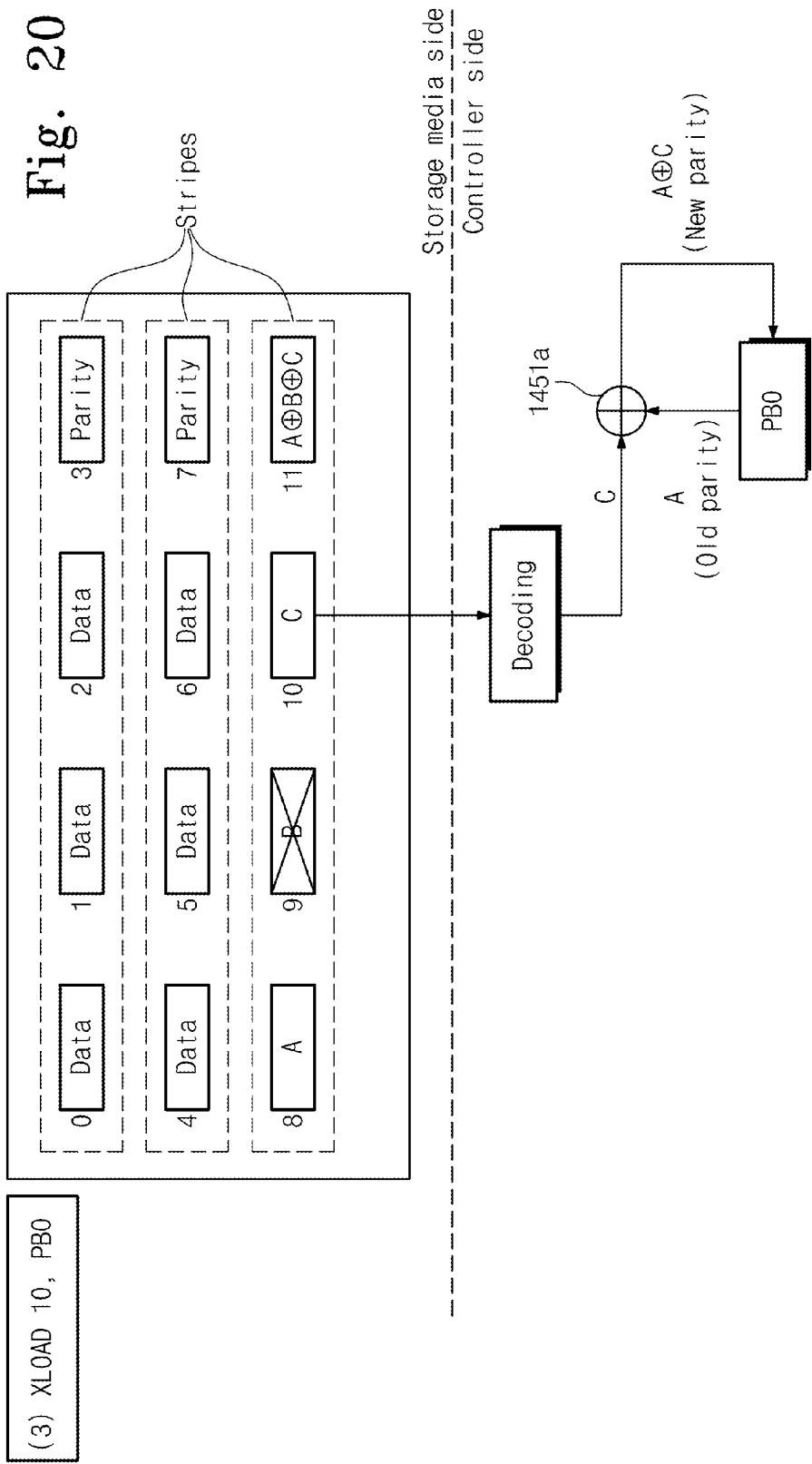
Figure 21:
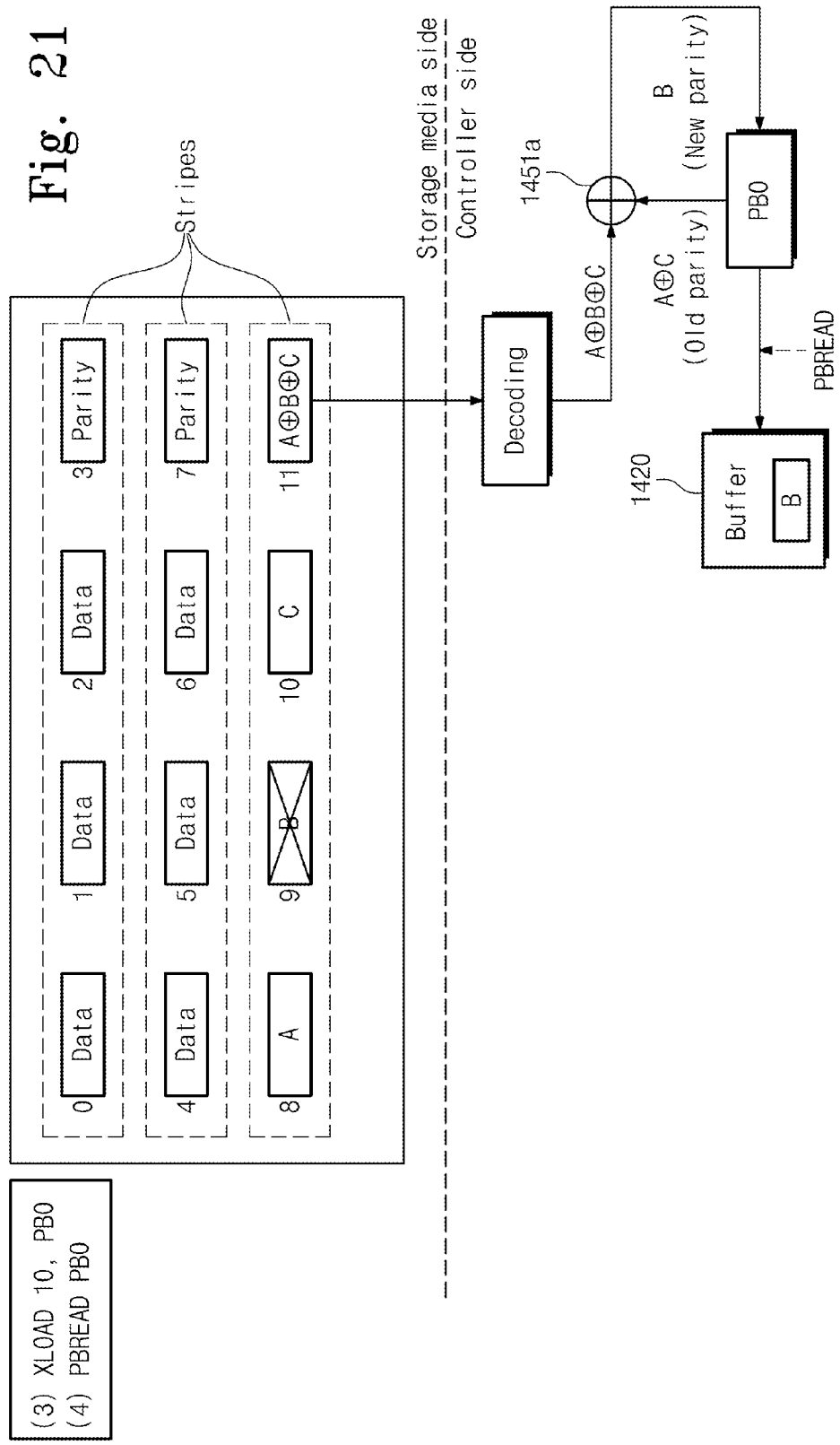

FIG. 18 is a UML sequence diagram for an unreadable data recovering operation of a data storage device according to an embodiment of the inventive concept. FIGS. 19 through 21 are diagrams of data flows for the unreadable data recovering operation illustrated in FIG. 18. For ease of description, it is assumed that one stripe consists of three data strips and one parity strip.

It is assumed that data (e.g., a data strip in FIG. 19) requested from a host system 2000 is unreadable. Whether a data strip is unreadable, as described above, may be determined according to whether errors in the data strip exceed the error correction capacity of ECC generating block 1452. When data (e.g., a data strip in FIG. 19) requested from a host system 2000 is judged to be unreadable, SSD controller 1000 recovers the unreadable data strip B using remaining strips (i.e., data and parity strips A, C, (A⊕B⊕C)) of a stripe including the unreadable data strip B, as will be more fully described below.

As illustrated in FIG. 18, processing unit 1430 sends a PBRESET command to flash memory controller 1450 (S201). The PBRESET command comprises an operation code and a parity buffer number (or, address) as described above. As the PBRESET command is sent to flash memory controller 1450, there may be reset a parity buffer (e.g., PB0) of parity generating block 1451 corresponding to a parity buffer number (or, address) of the PBRESET command. Parity buffer PB0 is set with null data as an old parity strip due to initialization (refer to FIG. 19). After parity buffer PB0 is reset, flash memory controller 1450 transfers a response related to the PBRESET command to processing unit 1430 (S202).

Where the response on the PBRESET command is received, processing unit 1430 sends an XLOAD command, accompanying parity generation (or, an XOR operation), to flash memory controller 1450 (S203). The XLOAD command comprises a source address for appointing a data strip A. Flash memory controller 1450 controls storage media 1200 such that a data strip A corresponding to the source address is read out. The read data strip A is sent to XOR logic 1451b as illustrated in FIG. 19. At this time, a decoding operation on data strip A is made. XOR logic 1451b performs an XOR operation on data (i.e., an old parity strip) stored in the selected parity buffer PB0 and the read data strip A and generate a new parity strip A. Because null data is stored in parity buffer PB0 as an old parity strip due to initialization, the new parity strip is identical to the read data strip. The new parity strip A thus generated is stored in the selected parity buffer PB0. Once the new parity strip is generated, flash memory controller 1450 sends a response on the XLOAD command to processing unit 1430 (S204).

The above-described operations S203 and S204 are repeated until remaining strips in a stripe other than the unreadable data strip are all read. For example, as illustrated in FIG. 20, a next strip C is read from storage media 1200 according to the XLOAD command accompanying parity generation (or, an XOR operation), and data strip C is decoded. In this case, XOR logic 1451b performs an XOR operation on data strip C transferred from storage media 1200 and a previous parity strip A of the selected parity buffer PB0 and generates a new parity strip (A⊕C). The parity strip (A⊕C) thus generated is stored in the selected parity buffer PB0. After data strip C is read, as illustrated in FIG. 20, a last strip within the stripe including the unreadable data strip B, i.e., a parity strip (A⊕B⊕C) is sent to flash memory controller 1450 according to an XLOAD command accompanying parity generation (or, an XOR operation), and the data strip (A⊕B⊕C) is decoded. In this case, XOR logic 1451b performs an XOR operation on the data strip (A⊕B⊕C) transferred from storage media 1200 and an old parity strip (A⊕C) of the selected parity buffer PB0 and generate a new parity strip B. Parity strip B thus generated is stored in the selected parity buffer PB0.

Referring to FIG. 18, if remaining strips A, C, and (A⊕B⊕C) other than the unreadable data strip B are all read, processing unit 1430 sends a PBREAD command to flash memory controller 1450 (S205). Flash memory controller 1450 provides buffer memory 1420 with parity strip B stored in the selected parity buffer PB0 in response to the PBREAD command. The transferred parity strip B is a recovered data strip. Flash memory controller 1450 sends a response to the PBREAD command to processing unit 1430. Afterward, the method ends.

Figure 22:
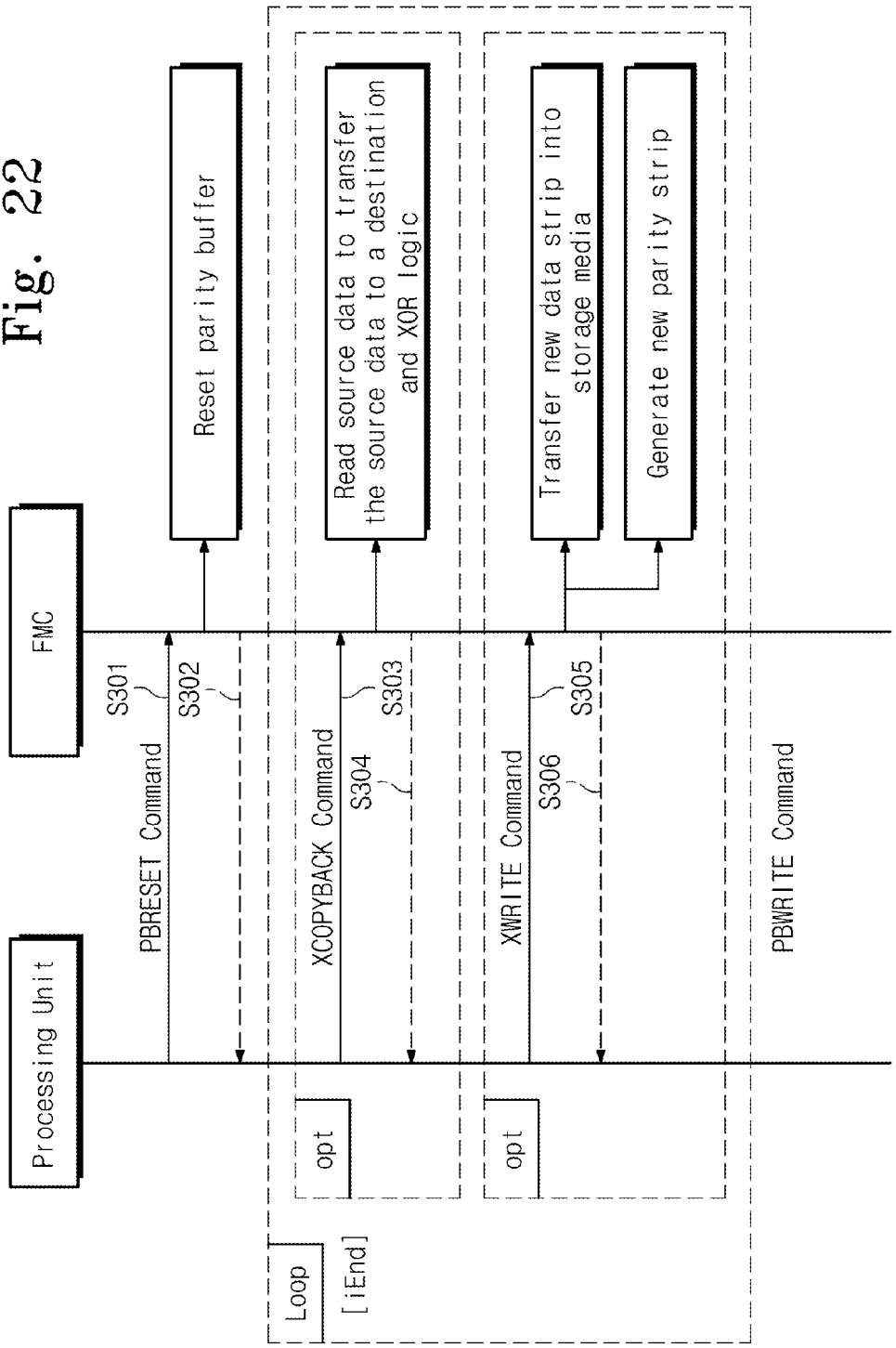
FIG. 22 is a UML sequence diagram for describing a copyback program operation of a data storage device according to an embodiment of the inventive concept.
Figure 23:
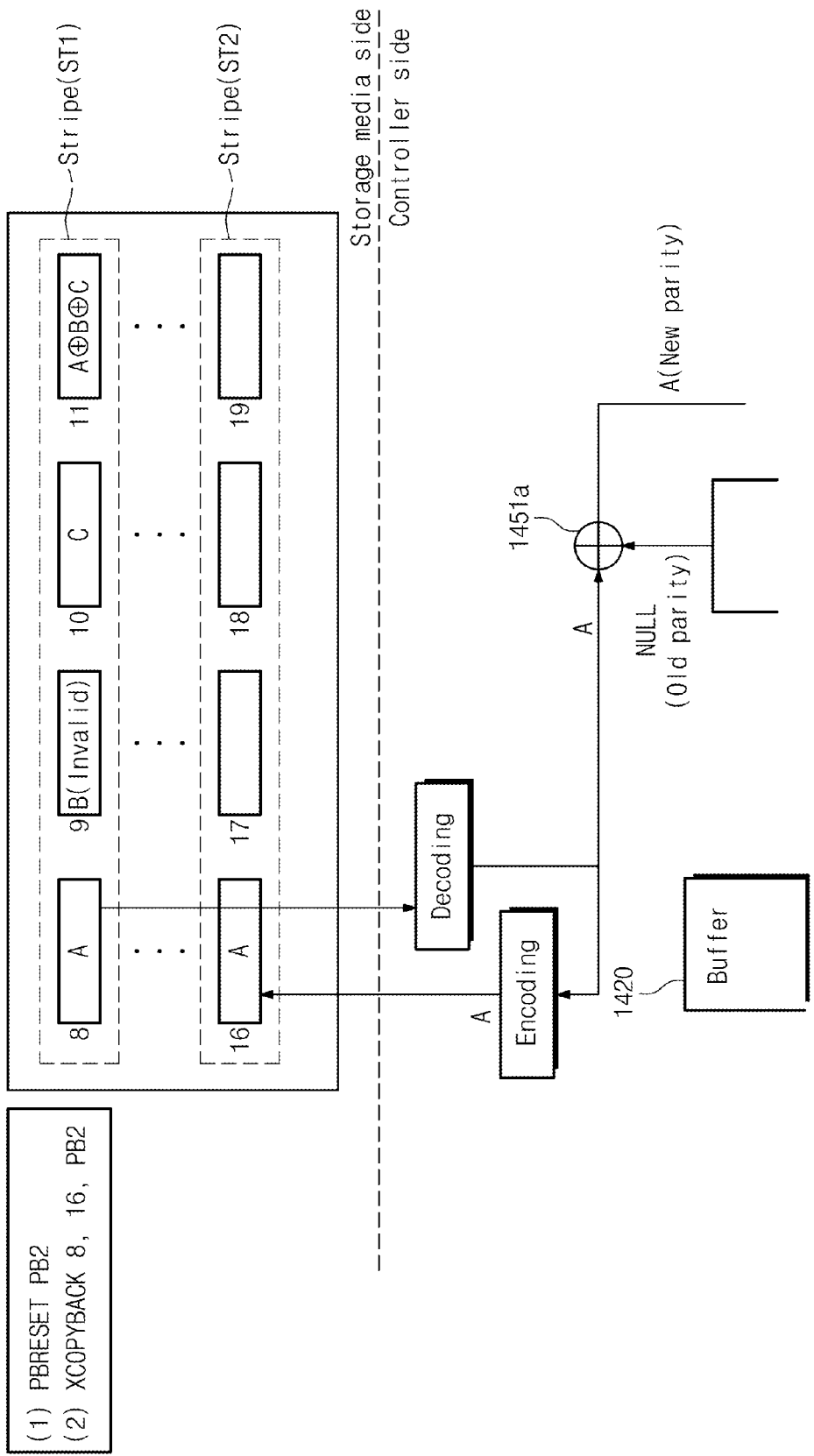
FIGS. 23 through 25 are diagrams of data flows for the copyback program operation illustrated in FIG. 22.
Figure 24:
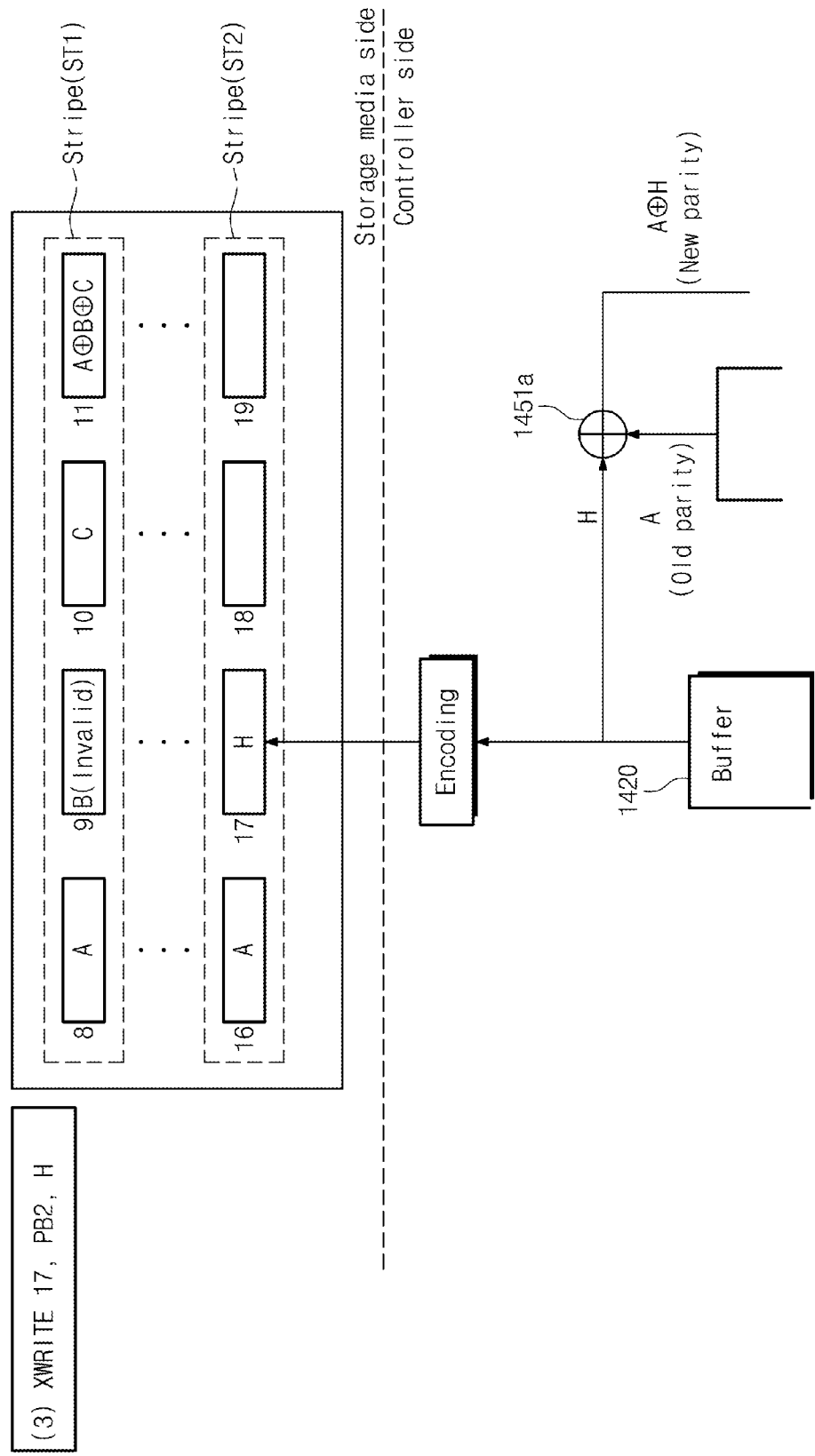
Figure 25:
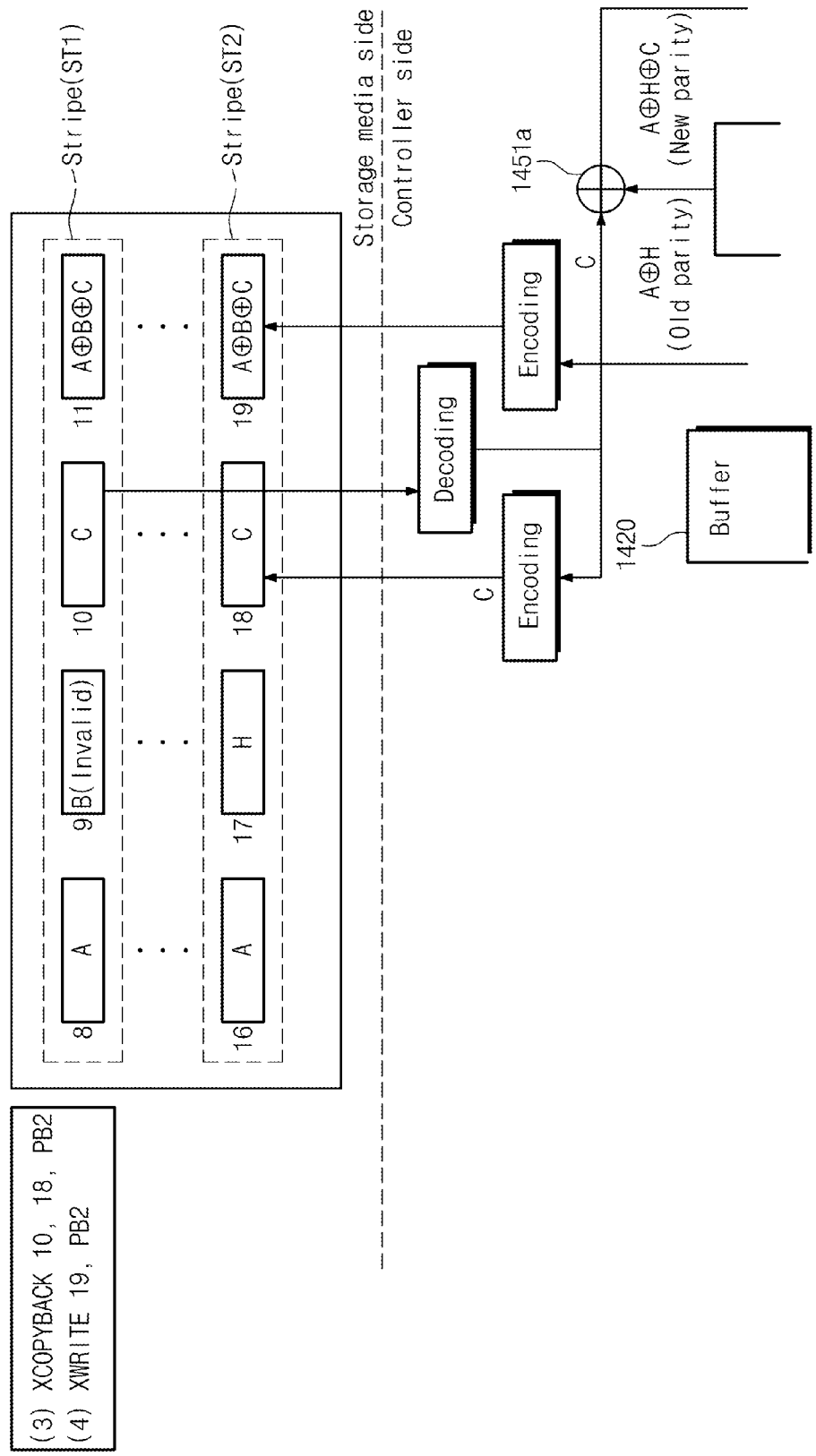

FIG. 22 is a UML sequence diagram for describing a copyback program operation of a data storage device according to an embodiment of the inventive concept. FIGS. 23 through 25 are diagrams of data flows for the copyback program operation illustrated in FIG. 22. For ease of description, it is assumed that a data strip B within one stripe (e.g., ST1 in FIG. 23) is processed to be an invalid data strip due to updating with a new data strip (e.g., H in FIG. 23) according to a request of host system 2000.

Referring to FIG. 22, processing unit 1430 sends a PBRESET command to flash memory controller 1450 (S301). The PBRESET command comprises an operation code and a parity buffer number (or, address) as described above. As the PBRESET command is transferred to flash memory controller 1450, a parity buffer (e.g., PB0) within parity generating block 1451 corresponding to a parity buffer number (or, address) of the PBRESET command is reset. Parity buffer PB0 is set with null data as an old parity strip due to the initialization (refer to FIG. 22). After parity buffer PB0 is reset, flash memory controller 1450 transfers a response on the PBRESET command to processing unit 1430 (S302).

As illustrated in FIG. 22, one loop can include XCOPYBACK and XWRITE commands each accompanying parity generation (or, an XOR operation). The XCOPYBACK command can be sent to flash memory controller 1450 to read a valid data strip from a source stripe, and the XWRITE command may be sent to flash memory controller 1450 to transfer a data strip to be updated to a destination stripe. Transferring of the XCOPYBACK and XWRITE command every loop may be performed selectively.

First of all, a copyback operation on the first data strip A within a stripe ST1 may be requested. This may be made through the XCOPYBACK command. Accordingly, processing unit 1430 sends the XCOPYBACK command to flash memory controller 1450 (S303). The XCOPYBACK command comprises source and destination addresses as described above. Where the source and destination addresses are sent from flash memory controller 1450 to storage media 1200, as illustrated in FIG. 23, a data strip A corresponding to the source address is sent to flash memory controller 1450. Data strip A is provided to XOR logic 1451b. At this time, the read data strip A is transferred again to storage media 1200 through flash memory controller 1450 without transferring to buffer memory 1420. ECC generating block 1452 performs decoding and encoding operations on the read data strip A.

XOR logic 1451b performs an XOR operation on data (i.e., an old parity strip) stored in the selected parity buffer PB0 and the read data strip A and generate a new parity strip A. Because null data is stored as the old parity data in the selected parity buffer PB0 due to initialization, the new parity strip is identical to the read data strip. The new parity strip A thus generated is stored in the selected parity buffer PB0. Once the new parity strip is generated, flash memory controller 1450 sends a response on the XCOPYBACK command to processing unit 1430 (S304).

Then, processing unit 1430 sends an XWRITE command to flash memory controller 1450 such that a new data strip H is stored in destination stripe ST2 instead of the invalid data strip B of source stripe ST1 (S305). As illustrated in FIG. 24, where the XWRITE command is sent to flash memory controller 1450, data strip H provided from buffer memory 1420 is transferred to storage media 1200. At this time, data strip H is encoded. At the same time, XOR logic 1451b performs an XOR operation on the transferred data strip H and an old parity strip A of a parity buffer PB0 appointed by a parity buffer number. As a result of the XOR operation, a new parity strip (A⊕H) may be stored in the selected parity buffer PB0. flash memory controller 1450 may send a response on the XWRITE command to processing unit 1430 (S306).

After the XWRITE command is executed, a copyback operation about the third data strip C in source stripe ST1 is requested. This may be made through the XCOPYBACK command. Accordingly, processing unit 1430 transfers the XCOPYBACK command to flash memory controller 1450 (S303). The XCOPYBACK command comprises source and destination addresses as described above. If the source and destination addresses are transferred from flash memory controller 1450 to storage media 1200, as illustrated in FIG. 25, a data strip C corresponding to the source address may be sent to flash memory controller 1450. At this time, the read data strip C is again transferred to storage media 1200 through flash memory controller 1450 without transferring to buffer memory 1420. Decoding and encoding of the read data strip C is made.

XOR logic 1451b performs an XOR operation on data (i.e., an old parity strip) (A⊕H) stored in the selected parity buffer PB0 and the read data strip C and generates a new parity strip (A⊕H⊕C). The new parity strip (A⊕H⊕C) thus generated is stored in the selected parity buffer PB0. Once the new parity strip (A⊕H⊕C) is generated, flash memory controller 1450 sends a response on the XCOPYBACK command to processing unit 1430 (S304).

Where the copyback operation of valid data strips and a transfer operation of a data strip to be updated are completed, as illustrated in FIG. 22, processing unit 1430 sends a PBWRITE command to flash memory controller 1450. Flash memory controller 1450 transfers the parity strip (A⊕H⊕C) in the selected parity buffer PB0 to storage media 1200 in response to the PBWRITE command. At this time, an encoding operation is carried out with respect to the parity strip (A⊕H⊕C) transferred to storage media 1200. After the parity strip (A⊕H⊕C) in the selected parity buffer PB0 is sent to storage media 1200, flash memory controller 1450 sends a response on the PBWRITE command to processing unit 1430. Afterwards, the method ends.

Figure 26:
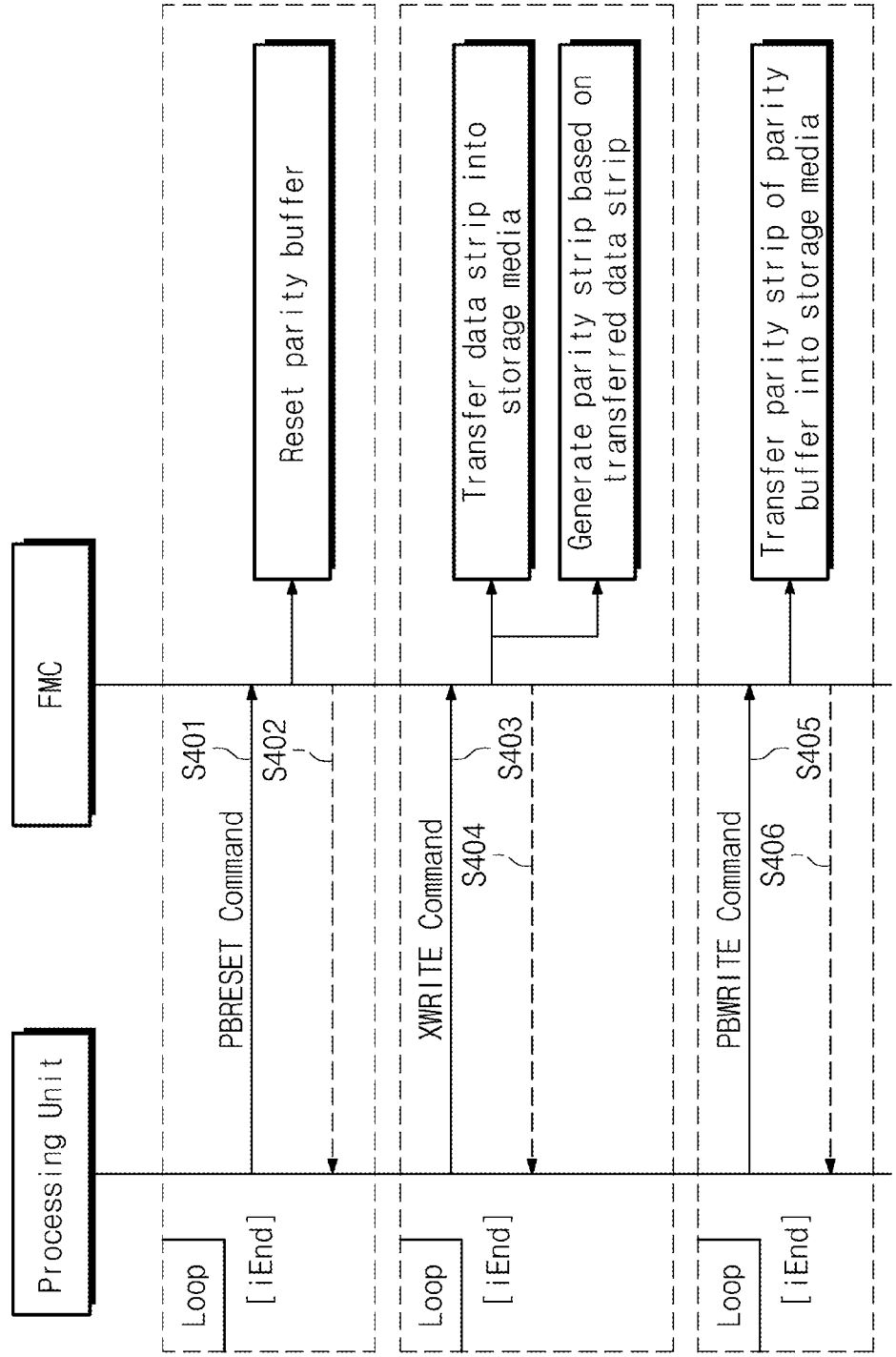
FIG. 26 is a UML sequence diagram for describing a full-stripe-write method of a data storage device according to another embodiment of the inventive concept.
Figure 27:
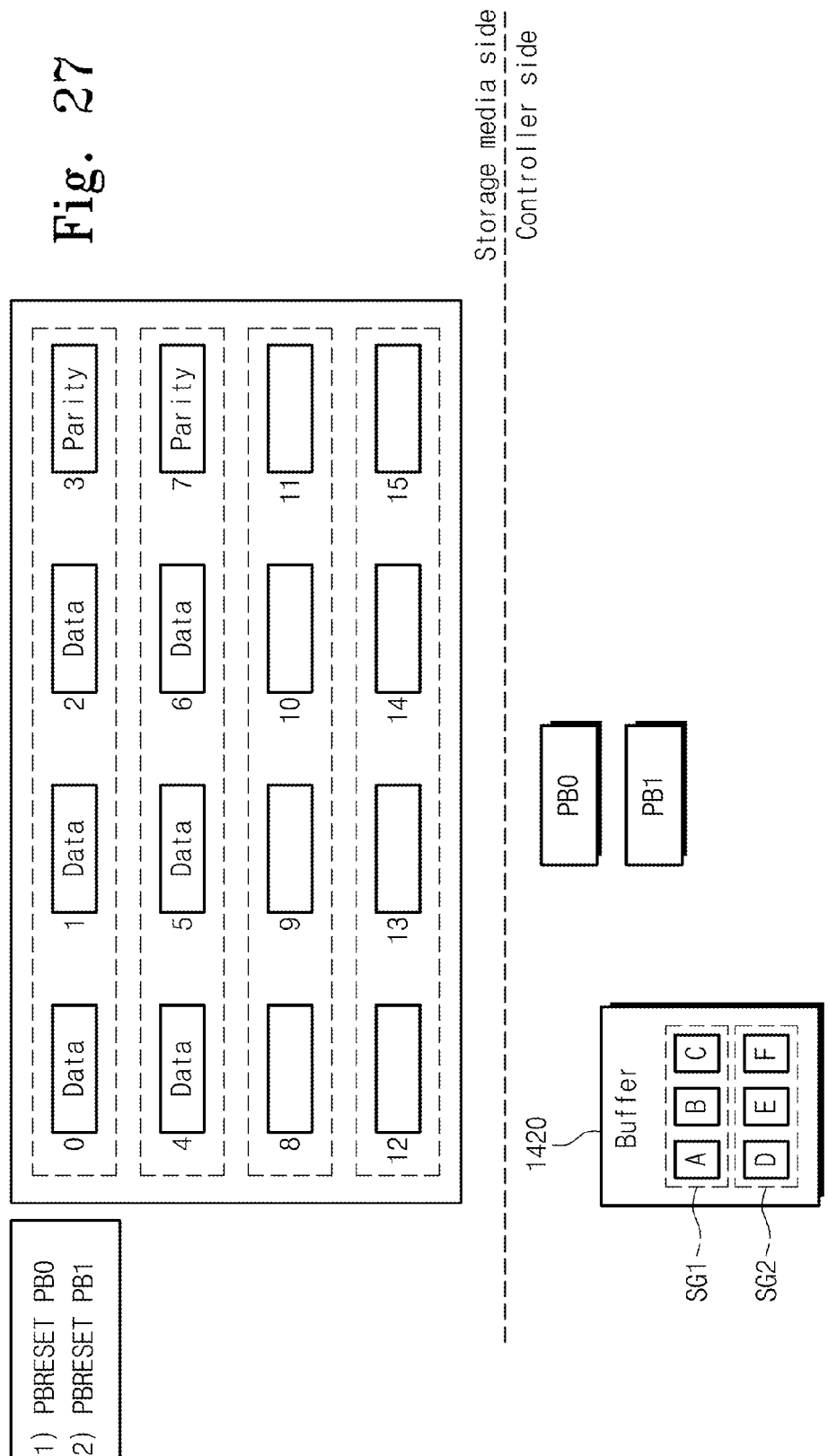
FIGS. 27 through 31 are diagrams of data flows for execution of the full-stripe-write operation illustrated in FIG. 26.

FIG. 26 is a UML sequence diagram for describing a full-stripe-write method of a data storage device according to another embodiment of the inventive concept. FIGS. 27 through 31 are diagrams of data flows upon execution of the full-stripe-write method illustrated in FIG. 26. FIG. 26 is a diagram for describing a full-stripe-write operation on two stripes. For example, as illustrated in FIG. 27, it is assumed that two strip groups SG1 and SG2 are prepared. A full-stripe-write operation illustrated in FIG. 26 is similar to that described in FIG. 14, and similar features will not be described in detail in order to avoid redundancy.

Referring to FIG. 26, processing unit 1430 sends a PBRESET command to flash memory controller 1450 to reset a parity buffer PB0 (S401). Flash memory controller 1450 resets parity buffer PB0 in response to the PBRESET command. After parity buffer PB0 is reset, flash memory controller 1450 sends a response on the PBRESET command to processing unit 1430 (S402). Processing unit 1430 sends the PBRESET command to flash memory controller 1450 to reset a parity buffer PB1, which will be carried out to be identical to that of parity buffer PB1. That is, as illustrated in FIG. 27, the number of parity buffers to be reset is identical to the number of strip groups to be sent to storage media 1200. Accordingly, resetting of a parity buffer in operations S401 and S402 can be performed iteratively by the number of strip groups to be sent.

Figure 28:
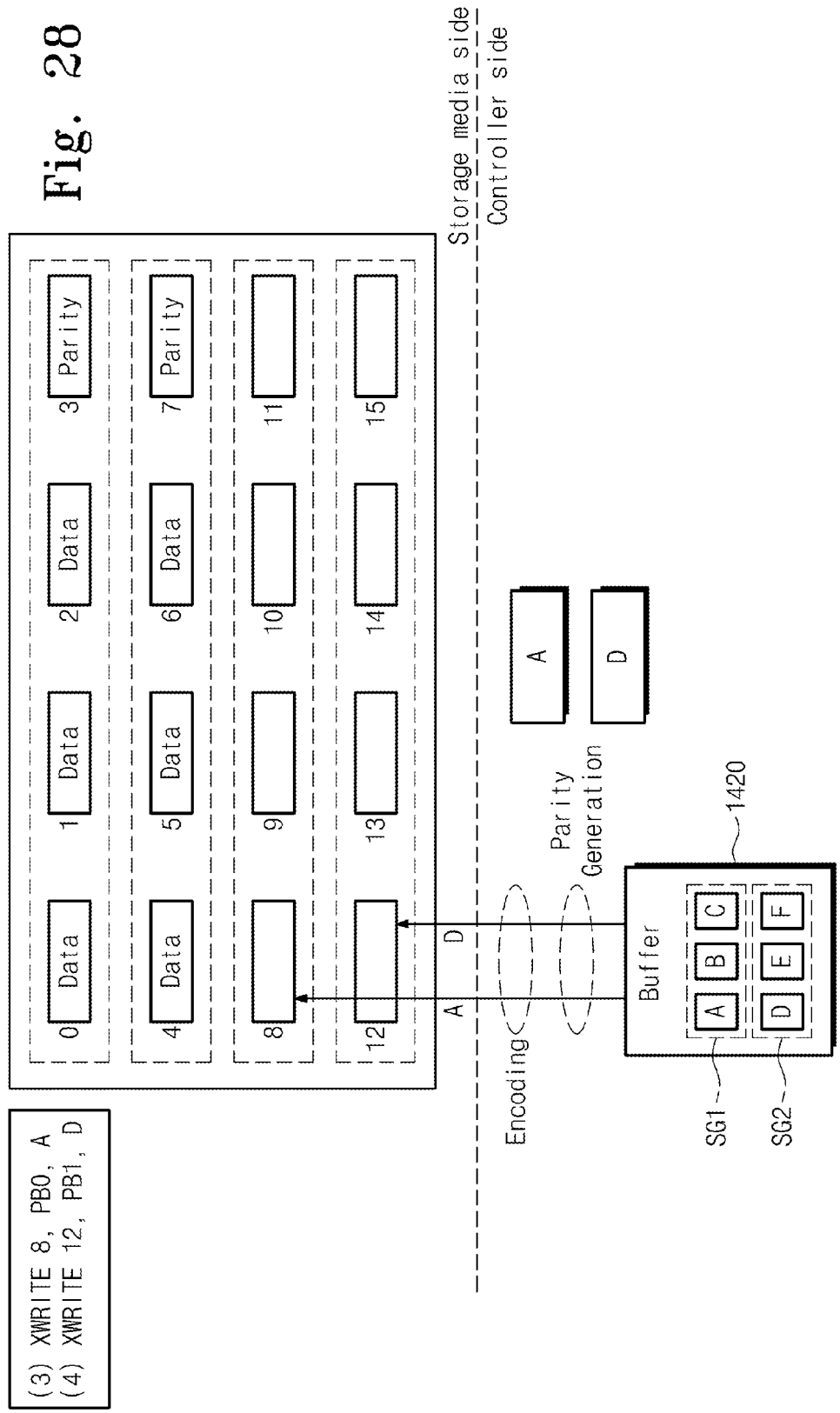

After parity buffers PB0 and PB1 are reset, processing unit 1430 transfers an XWRITE command to flash memory controller 1450 to send a data strip A of strip group SG1 to storage media 1200 (S403). At this time, as illustrated in FIG. 28, one data strip A of data strips A, B, and C in strip group SG1 stored in buffer memory 1420 is sent to flash memory controller 1450. Data strip A may be sent to storage media 1200. At the same time, as illustrated in FIG. 28, a new parity strip A is produced by performing an XOR operation on data strip A transferred from buffer memory 1420 to storage media 1200 and an old parity strip of the selected parity buffer PB0. After transferring of a data strip and generating of a parity strip are completed, flash memory controller 1450 sends a response on the XWRITE command to the processing unit (S404). The above-described operations S403 and S404 are repeated to transfer a data strip D in another strip group SG2 to storage media 1200.

Figure 29:
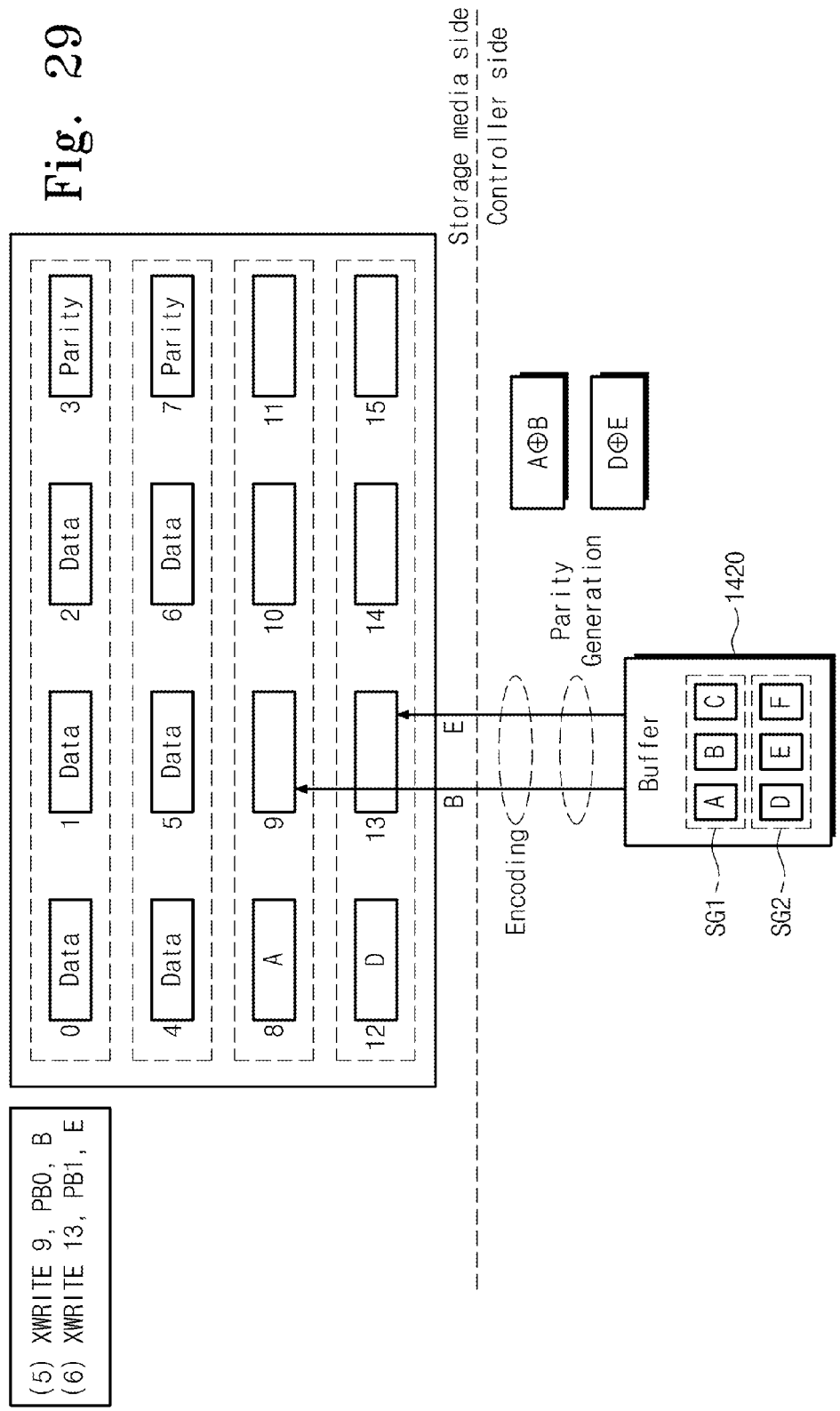
Figure 30:
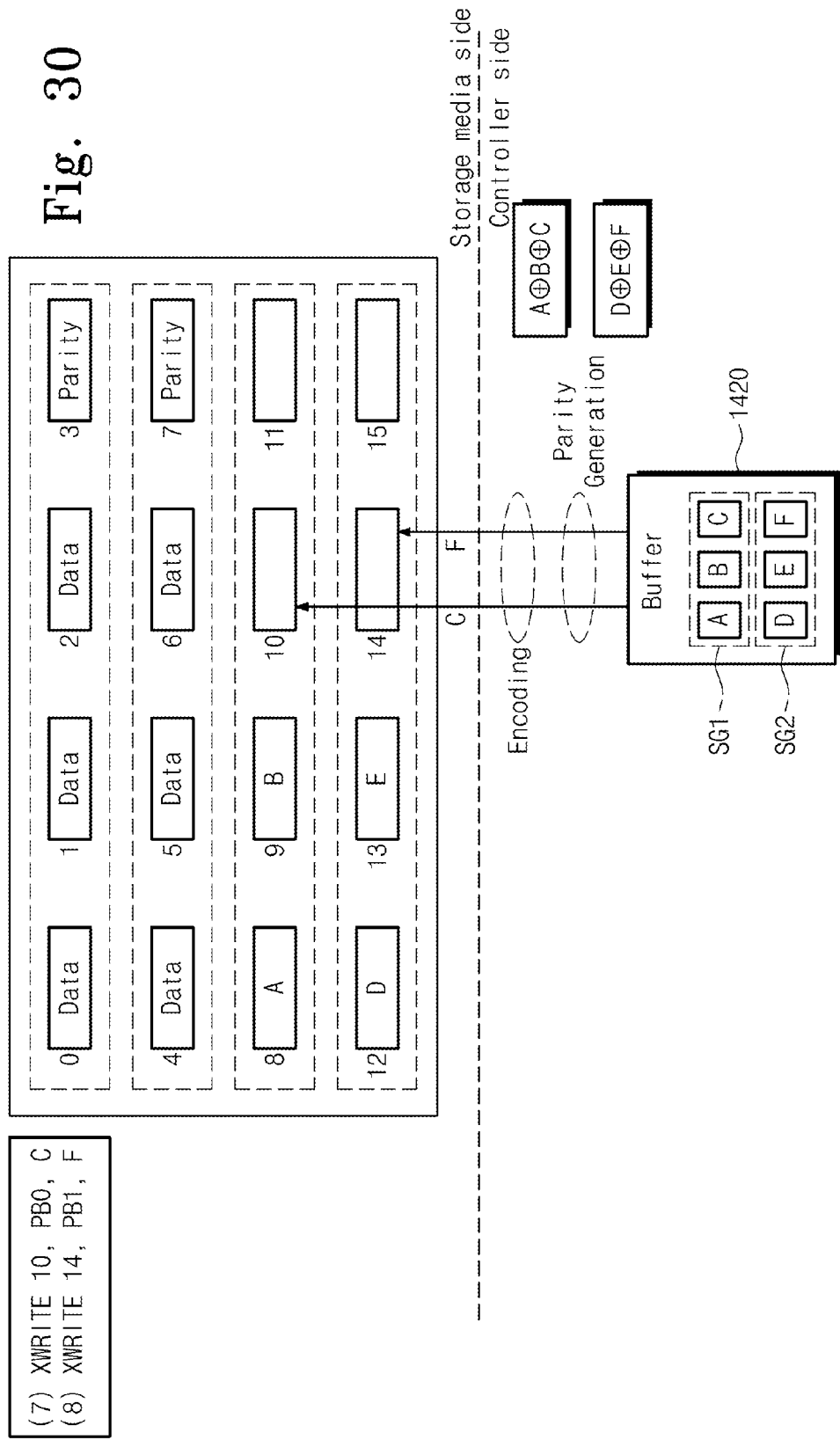

Remaining strips B and C in strip group SG1 and remaining strips E and F in strip group SG2 are transferred to storage media 1200 in the same manner as described in FIGS. 28 through 30. As a result, as illustrated in FIG. 30, a parity strip (A⊕B⊕C) is generated by performing an XOR operation on data strips A, B, and C in strip group SG1, and a parity strip (D⊕E⊕F) may be generated by performing an XOR operation on data strips D, E, and F in strip group SG2.

Figure 31:
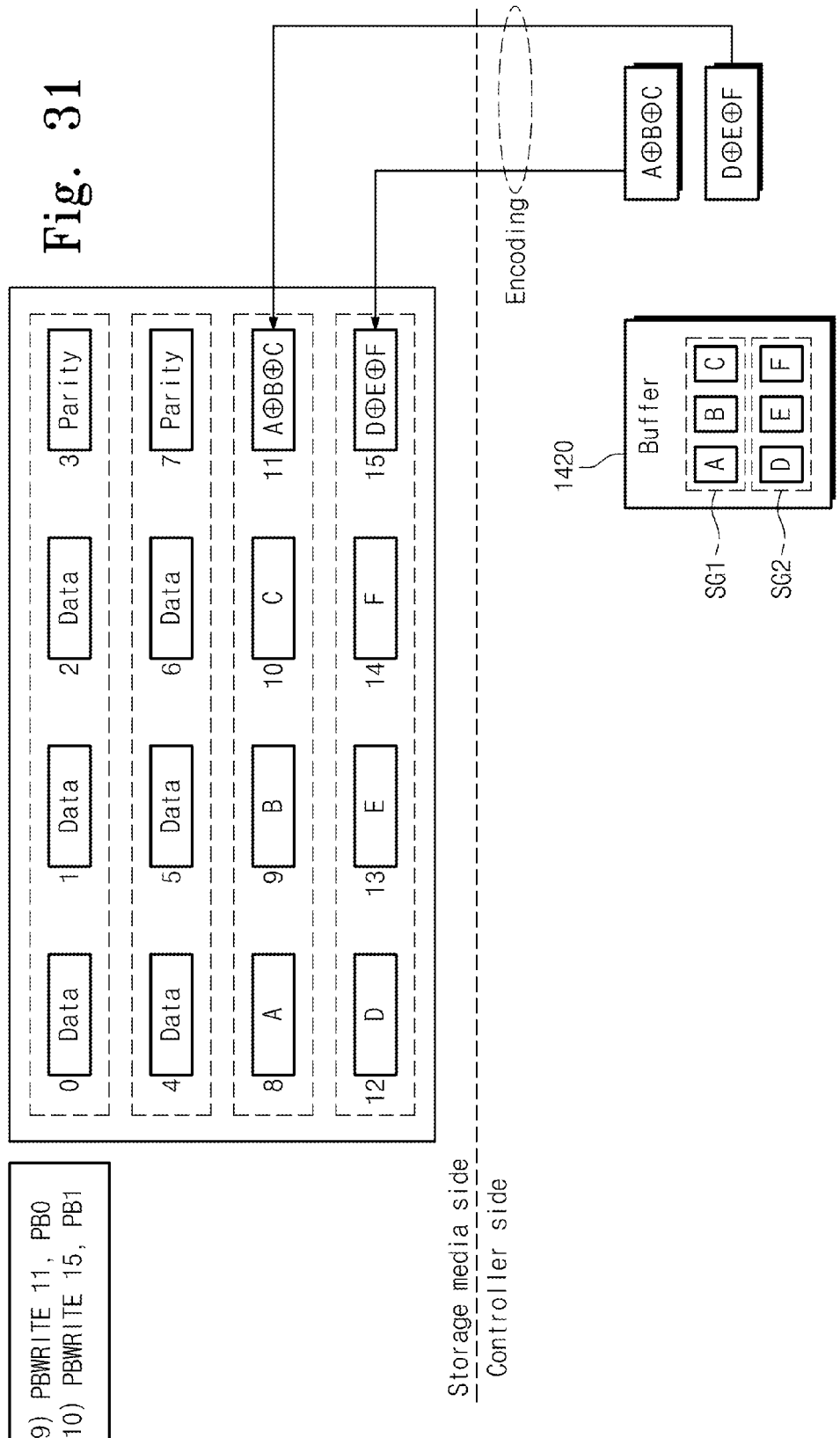

Referring again to FIG. 26, where the data strips (A, B, C) and (D, E, F) in strip groups SG1 and SG2 are all transferred, processing unit 1430 sends a PBWRITE command to flash memory controller 1450 to transfer a parity strip of parity buffer PB0 to storage media 1200 (S405). As the PBWRITE command is sent to flash memory controller 1450, as illustrated in FIG. 31, flash memory controller 1450 sends the parity strip (A⊕B⊕C) in the selected parity buffer PB0 to storage media 1200 in response to the PBWRITE command. After the parity strip (A⊕B⊕C) in the selected parity buffer PB0 is sent to storage media 1200, flash memory controller 1450 sends a response on the PBWRITE command to processing unit 1430 (S406). Like parity buffer PB0, the parity strip (D⊕E⊕F) of parity buffer PB1 is transferred to storage media 1200 according to the PBWRITE command. Afterwards, the method ends. As illustrated in FIGS. 28 through 31, where data and parity strips are sent to storage media 1200, an encoding operation is performed with respect to the data and parity strips.

Figure 32:
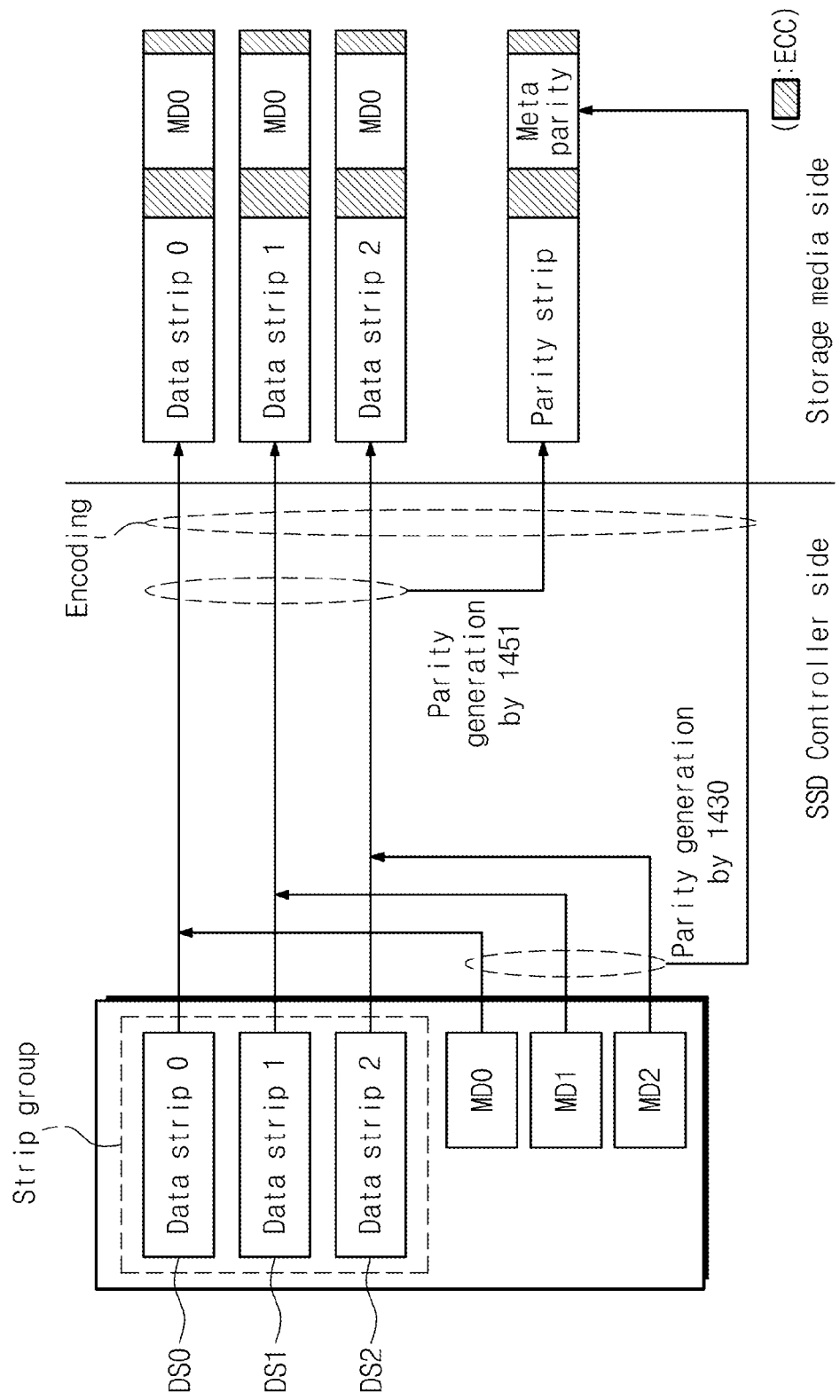
FIG. 32 is a diagram for describing a full-stripe-write method of a data storage device according to still another embodiment of the inventive concept.

FIG. 32 is a diagram for describing a full-stripe-write method of a data storage device according to still another embodiment of the inventive concept.

Referring to FIG. 32, data storage device 1000 manages meta data associated with data strips in a strip group. For example, processing unit 1430 of data storage device 1000 can manage meta data MD0, MD1, and MD2 each corresponding to data strips DS0, DS1, and DS2 of a strip group. Operations (e.g., a parity generating operation and an ECC adding operation) executed when each of data strips DS0, DS1, and DS2 are sent to storage media 1200 may be made to be identical to that described above, and description thereof is thus omitted. As described above, a parity strip may be generated by parity generating block 1451 and may be used to recover an unreadable data/parity strip.

As illustrated in FIG. 32, meta data MD0, MD1, and MD2 are sent to storage media 1200 together with corresponding data strips DS0, DS1, and DS2. Unlike generation of a parity strip associated with data strips DS0, DS1, and DS2, a parity generating operation of meta data MD0, MD1, and MD2 is made by processing unit 1430, not by parity generating block 1451. A parity associated with meta data MD0, MD1, and MD2 generated by processing unit 1430 is sent to storage media 1200. The parity associated with meta data MD0, MD1, and MD2 are used to recover unreadable meta data. That is, a correctable error of a data strip is corrected according to ECC information, and a correctable error of meta data is corrected according to ECC information. Further, an unreadable strip in a stripe is recovered according to remaining strips, and unreadable meta data in a stripe is recovered according to remaining meta data and parity.

FIGS. 33A through 33D are diagrams for describing stripe types applied to a data storage device according to an embodiment of the inventive concept.

A size of one stripe is determined variously according to a memory applied to storage media 1200. For example, it is assumed that storage media 1200 is formed of flash memory devices, and one stripe is formed of a plurality of strips. One strip can be formed of one or more pages.

Figure 33A:
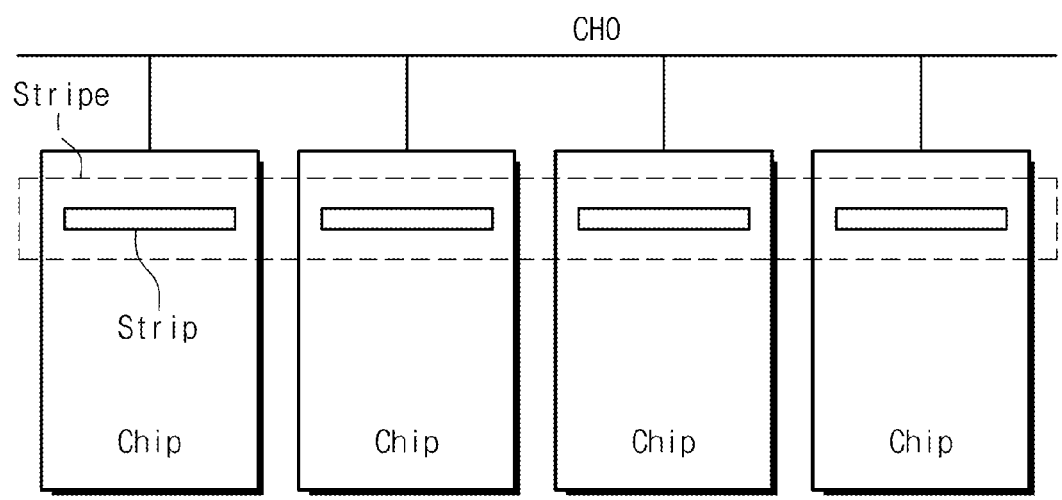
FIGS. 33A through 33D are diagrams for describing stripe types applied to a data storage device according to embodiments of the inventive concept.
Figure 33B:
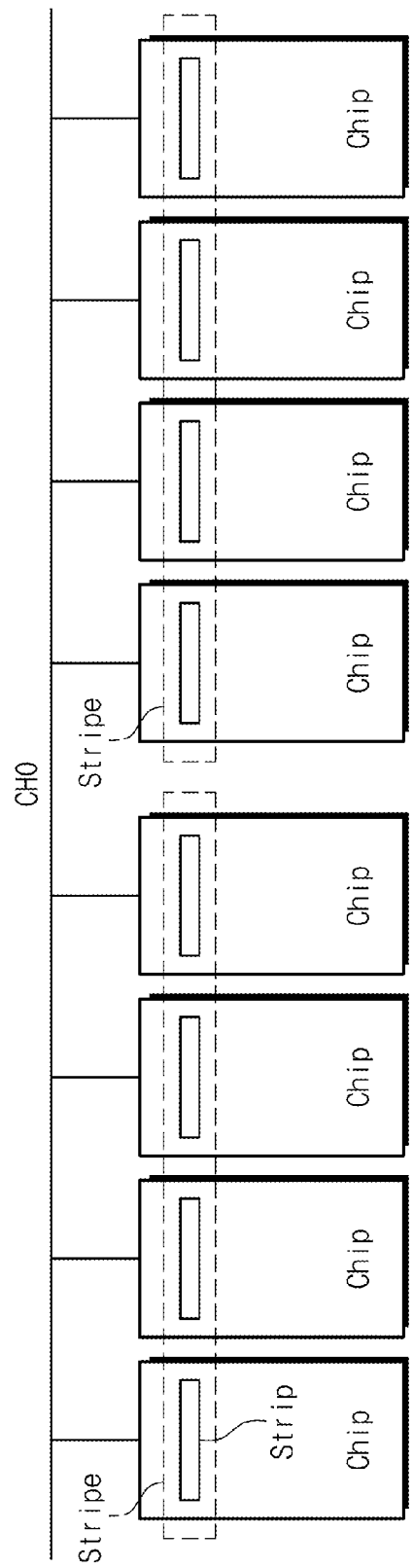
Figure 33C:
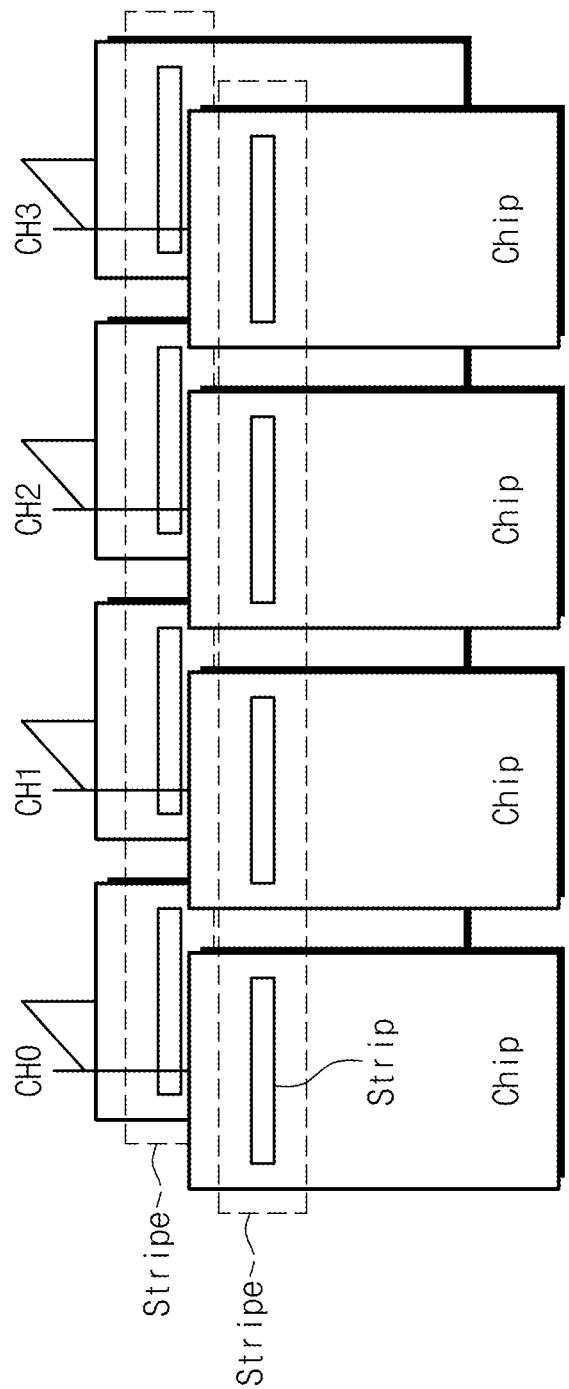
Figure 33D:
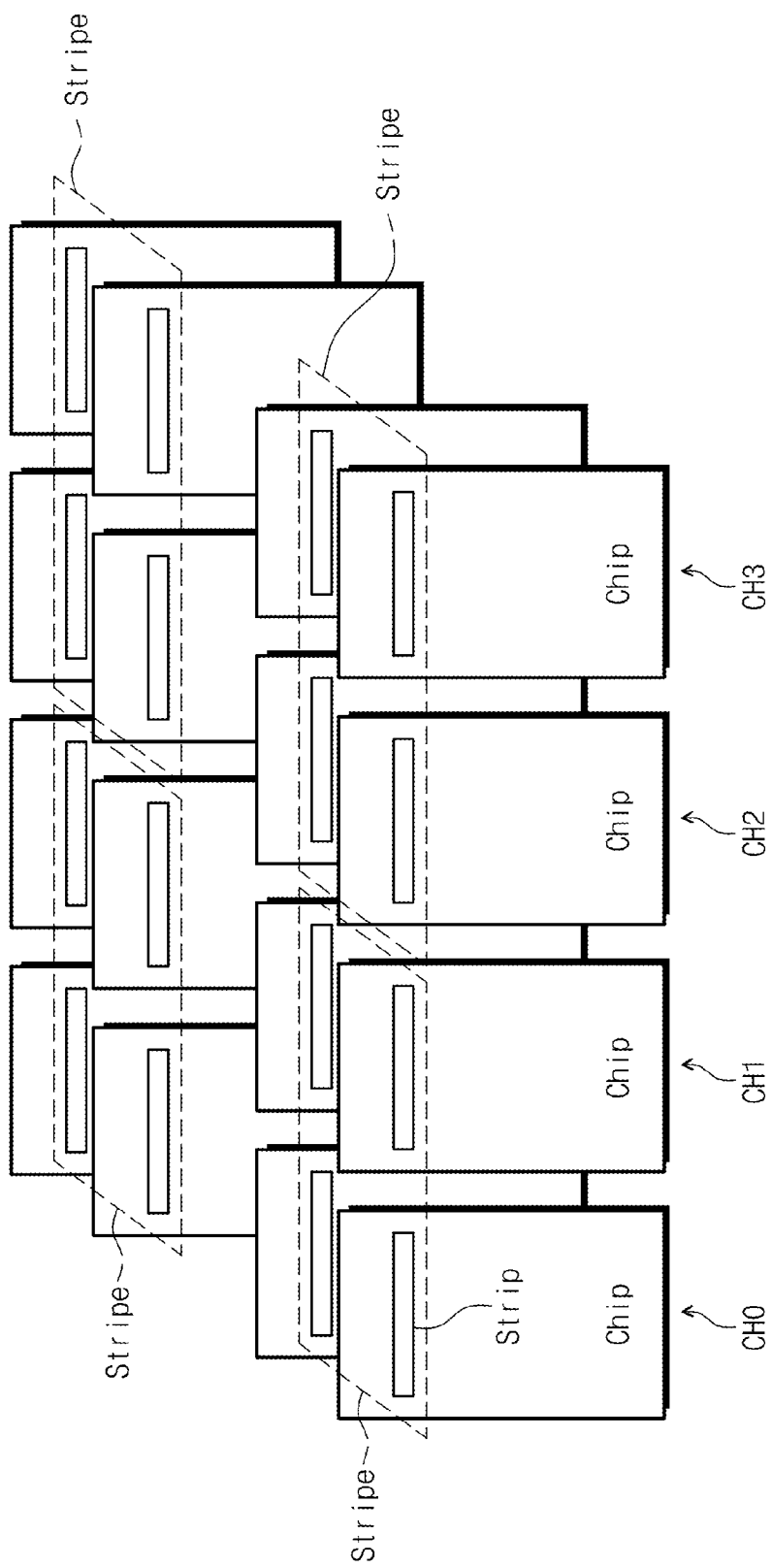

As illustrated in FIG. 33A, a stripe can be formed of strips corresponding to flash memory devices, connected with one channel, respectively. In another embodiment, as illustrated in FIG. 33B, assuming that flash memory devices connected with one channel are divided into at least two chip groups, a stripe may be formed of strips assigned to flash memory devices in each chip group, respectively. In still another embodiment, as illustrated in FIG. 33C, a stripe can be formed of strips assigned to flash memory devices connected with each of a plurality of channels CH0, CH1, CH2, and CH3, respectively. In still another embodiment, as illustrated in FIG. 33D, assuming that a plurality of channels are divided into at least two channel groups and that flash memory devices connected in common with channels in each channel group are divided into at least two chip groups, a stripe can be formed of strips assigned to flash memory devices in each chip group of each channel group, respectively.

There are other ways of configuring a stripe in addition to those presented in this description. For example, if a flash memory device has a plane structure, a stripe can be set up on the basis of a plane, not a chip.

Figure 34:
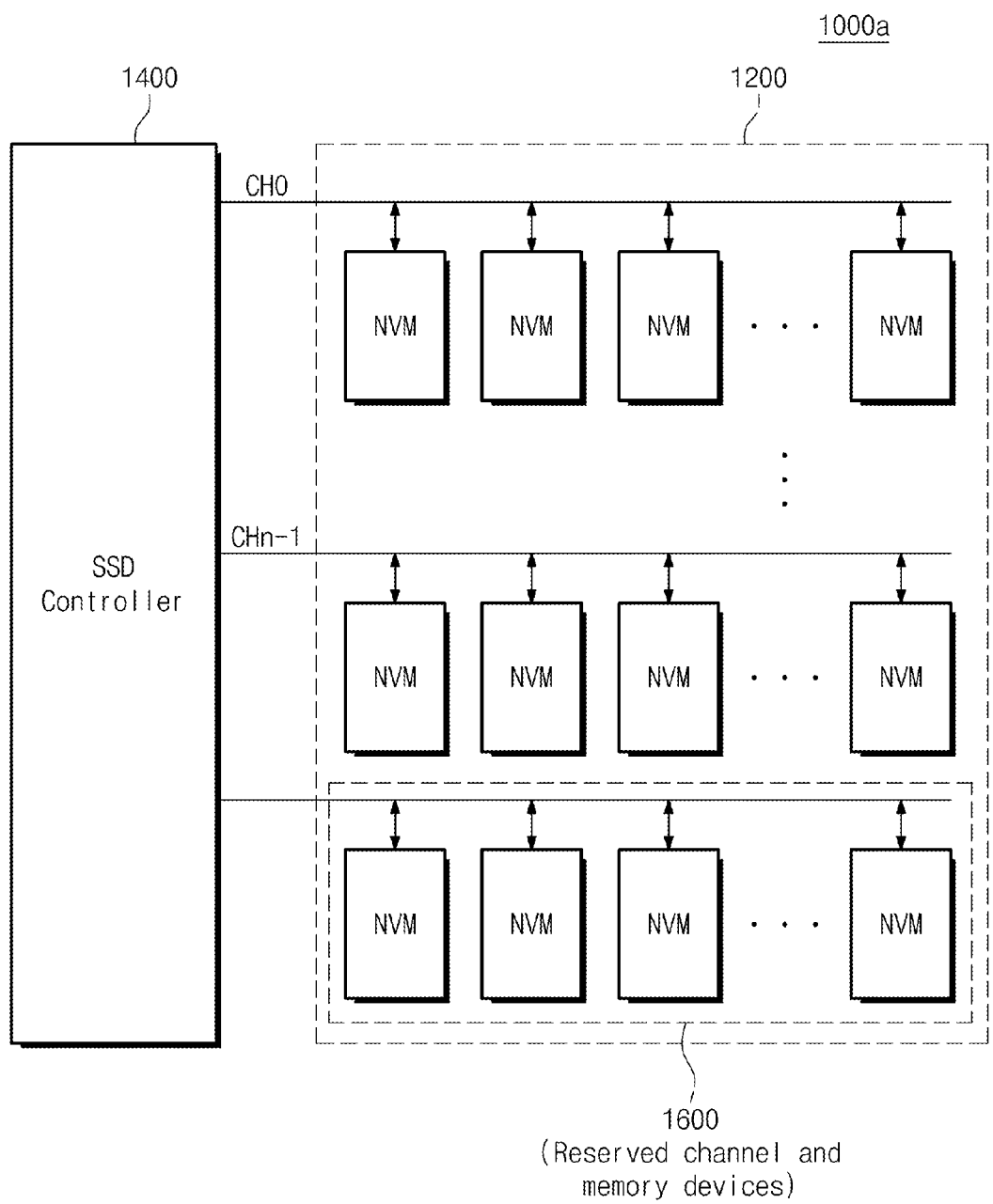
FIG. 34 is a block diagram of a data storage device according to another embodiment of the inventive concept.

FIG. 34 is a block diagram of a data storage device according to another embodiment of the inventive concept.

Referring to FIG. 34, a data storage device 1000a comprises storage media 1200 and SSD controller 1400. Storage media 1200 comprises flash memory devices accessed through a plurality of channels CH0 through CHn−1. Storage media 1200 further comprises a reserved channel and memory devices 1600, which can be used to replace any channel or flash memory devices connected with any channel. Data storage device 1000a of FIG. 34 operates similar to that of FIG. 32 except for the above-described differences, so a further description thereof will be omitted in order to avoid redundancy.

Figure 35:
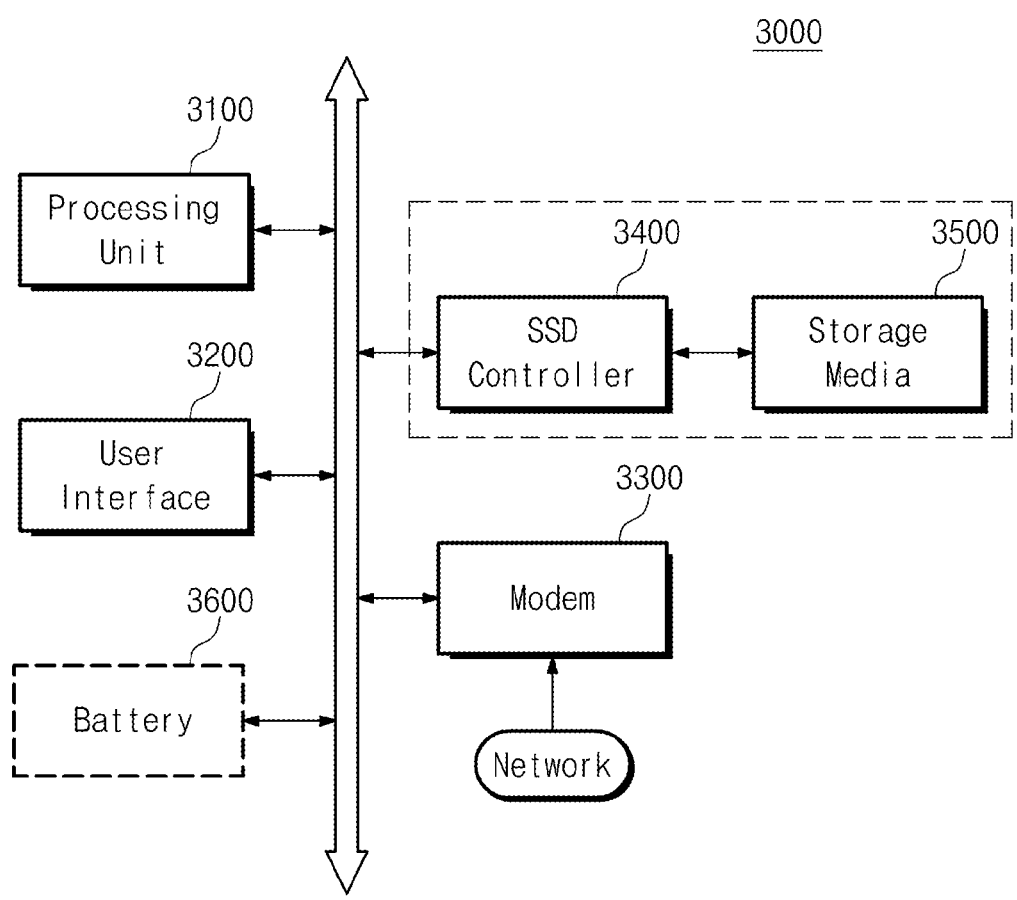
FIG. 35 is a block diagram of a computing system comprising a data storage device according to an embodiment of the inventive concept.

FIG. 35 is a block diagram of a computing system 3000 comprising a data storage device according to an embodiment of the inventive concept.

Referring to FIG. 35, computing system 3000 comprises a processing unit 3100 such as a microprocessor, a user interface 3200, a modem 3300 such as a baseband chipset, an SSD controller 3400, and storage media 3500. SSD controller 3400 and storage media 3500 can be formed similar to the data storage device (e.g., a solid state drive) illustrated in FIG. 1, so a description thereof is thus omitted. N-bit data (N being an integer of 1 or more) processed/to be processed by processing unit 3100 is stored in storage media 3500 through SSD controller 340. Where computing system 3000 is a mobile device, it may further comprise a battery 3500 that supplies an operating voltage of the computing system. Although not shown in FIG. 35, computing system 3000 can further comprise an application chipset, a camera image processor (CIS), or a mobile DRAM.

Figure 36:
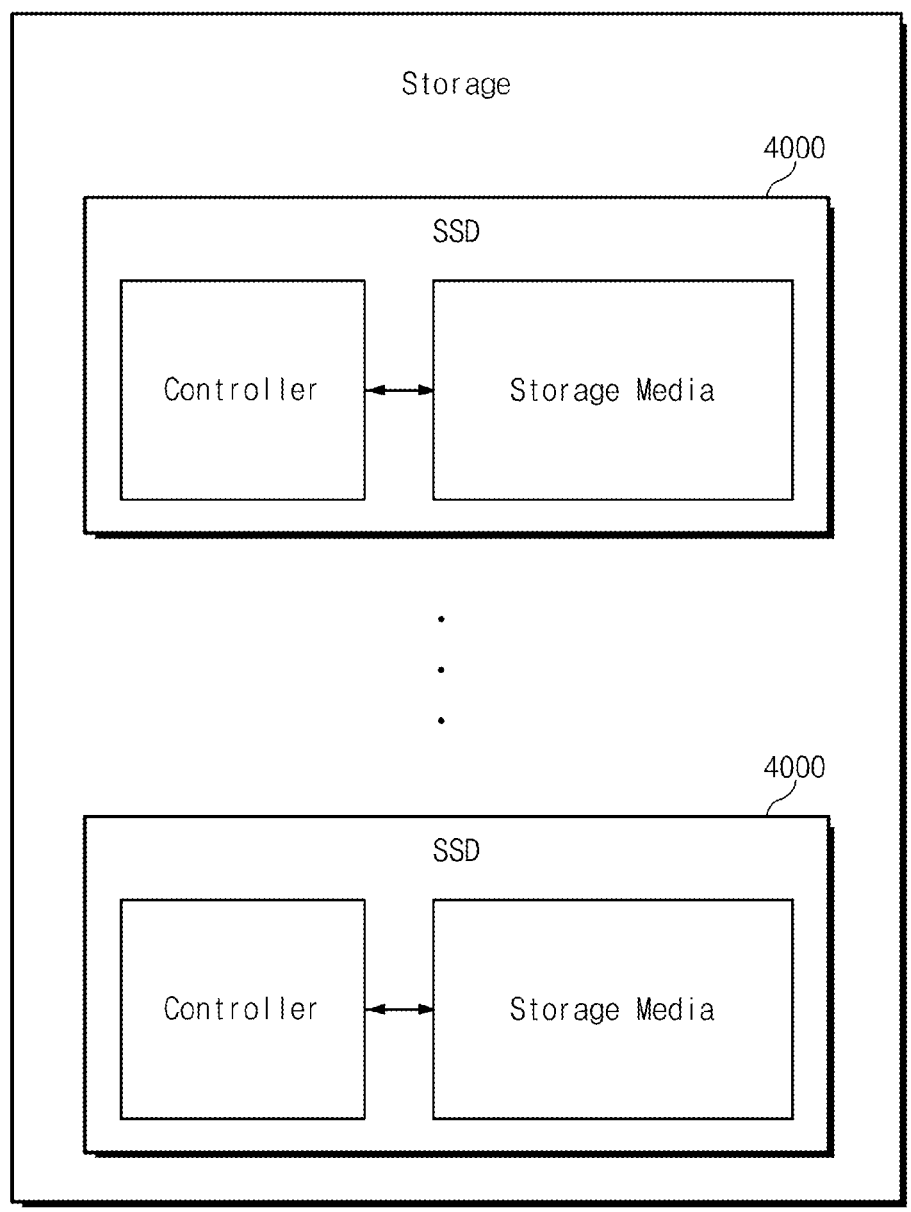
FIG. 36 is a block diagram of storage using a data storage device according to an embodiment of the inventive concept.
Figure 37:
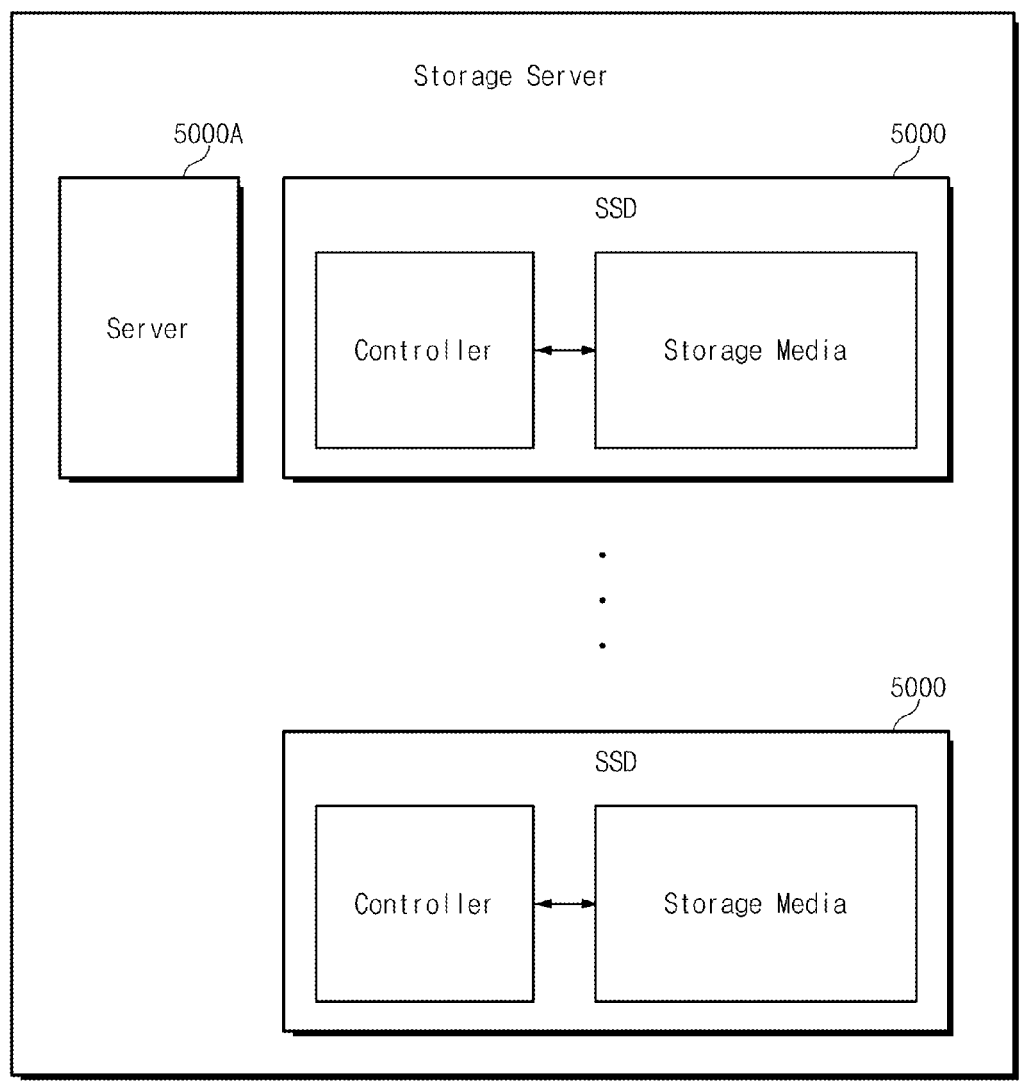
FIG. 37 is a block diagram of a storage server using a data storage device according to an embodiment of the inventive concept.

FIG. 36 is a block diagram of storage using a data storage device according to an embodiment of the inventive concept, and FIG. 37 is a block diagram of a storage server using a data storage device according to an embodiment of the inventive concept.

The data storage device of FIG. 36 comprises a plurality of solid-state drives 4000 configured to operate similar to that described with reference to FIGS. 1 through 34. Solid-state drive 4000 is used as a storage server. As illustrated in FIG. 37, the storage server comprises a plurality of solid-state drives 5000 and server 5000A. The plurality of solid state drives 5000 are configured to operate similar to that described in relation FIGS. 1 through 34, so a detailed description thereof will be omitted in order to avoid redundancy.

Figure 38:
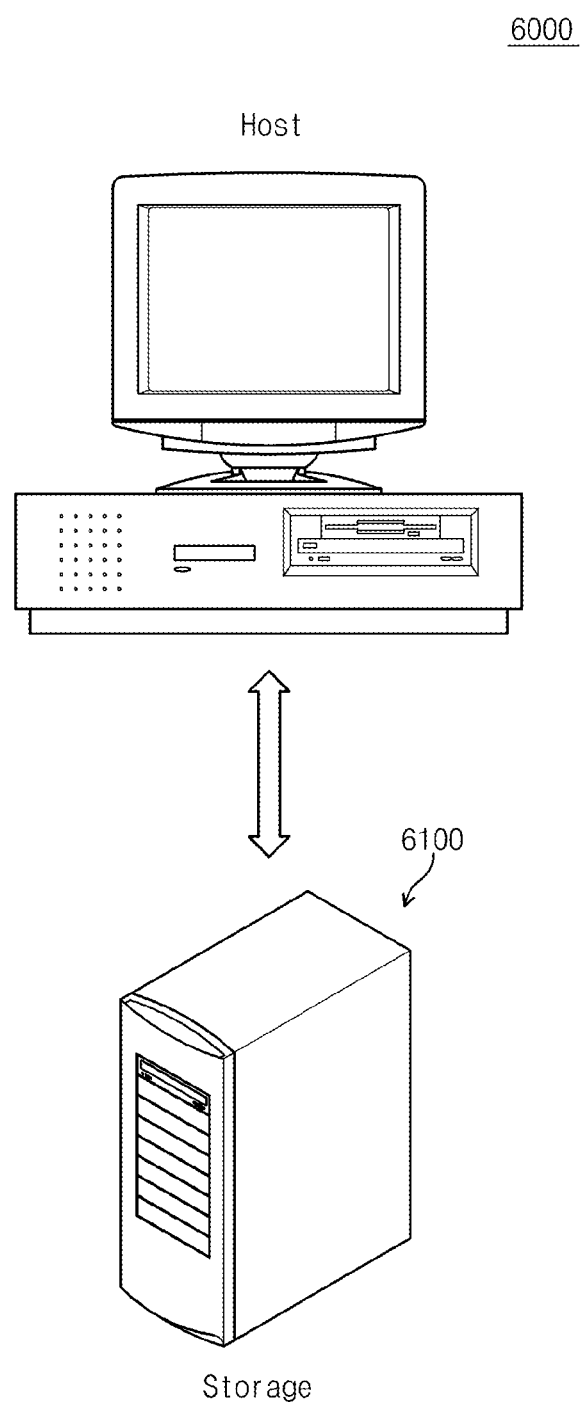
FIGS. 38 through 40 are diagrams of systems incorporating a data storage device according to embodiments of the inventive concept is applied.
Figure 39:
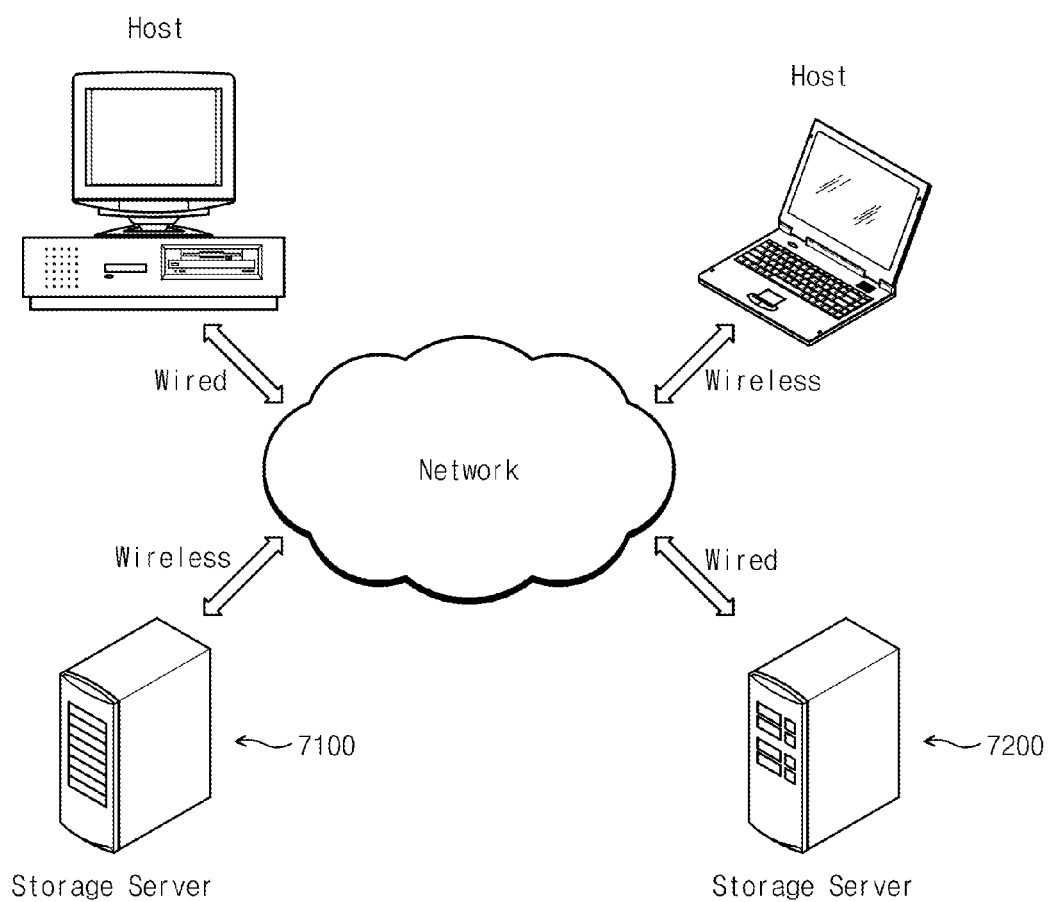
Figure 40:
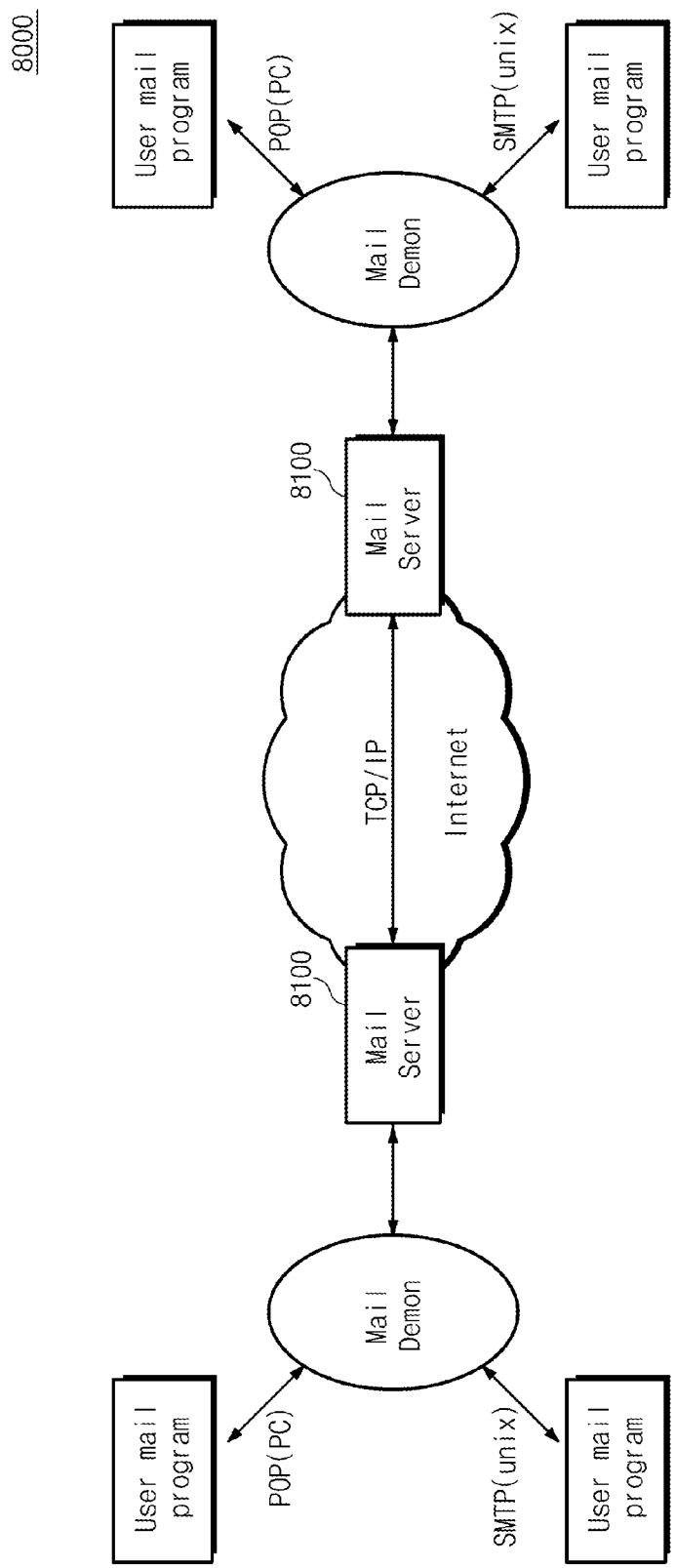

FIGS. 38 through 40 are diagrams of systems incorporating a data storage device according to embodiments of the inventive concept.

Where a solid state drive is applied to the storage as a data storage device according to embodiments of the inventive concept, as illustrated in FIG. 28, a system 6000 comprises a storage 6100 that communicates with a host in a wired and/or wireless manner. Where a solid state drive is applied to a storage server as a data storage device according to embodiments of the inventive concept, as illustrated in FIG. 29, a system 7000 comprises storage servers 7100 and 7200 that communicate with a host in a wired and/or wireless manner. Further, as illustrated in FIG. 40, a solid-state drive is applied to a mail server 8100 as a data storage device according to embodiments of the inventive concept.

As described above, in a full-stripe-write operation, a parity strip is generated on the basis of data strips transferred to storage media without additional access to a buffer memory. The parity strip can be produced according to commands accompanying parity generation (or, an XOR operation). ECC information is added to each of data and parity strips. Parities of meta data associated with data strips may be generated by a processing unit, not a parity-generating block. Accordingly, it is possible to perform a full-stripe-write operation without additional access to the buffer memory for generation of a parity strip.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined by the claims and their equivalents.

What is claimed is:

1. A method of performing a write operation in a data storage device comprising a storage medium, a processing unit, a controller, and a buffer memory storing data to be transferred to the storage medium under control of the processing unit, the method comprising:
   aggregating data in the buffer memory as a strip group comprising multiple data strips;
   transferring data strips in at least one strip group from the buffer memory to the controller;
   transferring the data strips from the controller to the storage medium;
   calculating a parity strip based on the data strips transferred from the buffer to the controller without additional access to the buffer memory; and
   after all of the data strips have been transferred to the storage medium, transferring the parity strip to the storage medium.

2. The method of claim 1, further comprising adding error correction code (ECC) information to each of the data strips of the at least one strip group and the parity strip.

3. The method of claim 2, wherein the parity strip is calculated according to commands from the processing unit, the commands accompanying an XOR operation of the data strips of the at least one strip group.

4. The method of claim 2, wherein aggregating data in the buffer memory as a strip group comprises an address mapping operation of the processing unit.

5. The method of claim 2, wherein calculating a parity strip based on the transferred data strips of the at least one strip group without additional accessing to the buffer memory comprises:
   (a) resetting a parity buffer;
   (b) performing an XOR operation on one of the data strips of the at least one strip group transferred to the storage media and a value of the parity buffer as a previous parity, without additional accessing to the buffer memory, to store a result of the XOR operation in the parity buffer; and
   (c) repeating (b) until remaining data strips of the at least one strip group are all transferred to the storage medium.

6. The method of claim 5, wherein after all data strips of the at least one strip group are transferred to the storage medium, a value in the parity buffer is transferred to the storage medium as the parity strip.

7. The method of claim 1, wherein each of the data and parity strips comprises at least one page.

8. The method of claim 2, wherein the data strips of the at least one strip group and the parity strip constitute a full-stripe-write unit.

9. The method of claim 8, wherein where data strips in a source stripe are copied back to a target stripe, the data strips are transferred to the target stripe without being transferred to the buffer memory.

10. The method of claim 2, further comprising:
    generating meta data for each of the data strips of the at least one strip group; and
    calculating parity data for meta data of the data strips through the processing unit, wherein the parity strip on the data strips is calculated by an accelerator independent from the processing unit and ECC information being added to the parity data.

11. The method of claim 1, wherein the storage medium comprises a flash memory device.

12. A data storage device comprising:
   storage media;
   a buffer memory configured to temporarily store data to be transferred to the storage media;
   a processing unit configured to control transfer of the data from the buffer memory to the storage media;
   control logic configured to control an access operation of the storage media under control of the processing unit; and
   a parity generator configured to generate a parity strip based on data strips of at least one strip group transferred from the buffer memory to the control logic under control of the processing unit and without additional access to the buffer memory,
   wherein the control logic is further configured to transfer the data strips to the storage media, and to transfer the parity strip to the storage media after all of the data strips have been transferred to the storage media.

13. The data storage device of claim 12, wherein the processing unit is configured to aggregate data in the buffer memory as a strip group of data strips.

14. The data storage device of claim 12, wherein the storage media comprise a plurality of flash memory devices.

15. The data storage device of claim 14, wherein the control logic and the parity generator constitute a flash memory controller.

16. The data storage device of claim 15, wherein where at least one strip group is prepared, the processing unit provides the flash memory controller with a write command accompanying an XOR operation for a data strip transferred to the storage media when each of the data strips of the at least one strip group is transferred to the storage media.

17. The data storage device of claim 16, wherein when the write command accompanying an XOR operation is provided to the flash memory controller, the control logic provides address information related with the transferred data strip to the storage media, and the parity generator calculates the parity strip based on the transferred data strip.

18. A method of performing a write operation in a memory device comprising a flash memory, a processing unit, a flash translation layer (FTL), a flash memory controller, and a buffer memory storing data to be transferred to the flash memory under control of the processing unit, the method comprising:
   storing data in the buffer memory;
   aggregating the data stored in the buffer memory as a strip group comprising multiple data strips by performing address mapping in the FTL;
   transferring the data strips in the strip group from the buffer memory to the flash memory controller;
   transferring the data strips from the flash memory controller to the flash memory;
   performing an XOR operation on the data strips transferred from the buffer memory to the flash memory controller to generate a parity strip; and
   transferring the parity strip to the flash memory.

19. The method of claim 18, further comprising adding error correction code (ECC) information to each of the data strips of the at least one strip group and the parity strip.

20. The method of claim 18, wherein each data strip corresponds to a page of the flash memory device.

* * * * *